United States Patent
Xia

(10) Patent No.: US 12,437,473 B2
(45) Date of Patent: Oct. 7, 2025

(54) METHOD AND APPARATUS FOR STORING VISIBILITY DATA OF THREE-DIMENSIONAL MODEL, DEVICE, AND STORAGE MEDIUM

(71) Applicant: Tencent Technology (Shenzhen) Company Limited, Shenzhen (CN)

(72) Inventor: Fei Xia, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 151 days.

(21) Appl. No.: 18/207,577

(22) Filed: Jun. 8, 2023

(65) Prior Publication Data

US 2023/0326129 A1    Oct. 12, 2023

Related U.S. Application Data

(63) Continuation of application No. PCT/CN2022/127985, filed on Oct. 27, 2022.

(30) Foreign Application Priority Data

Nov. 19, 2021   (CN) .......................... 202111374336.0
Dec. 28, 2021   (CN) .......................... 202111624049.0

(51) Int. Cl.
*G06T 17/00*    (2006.01)
*G06V 10/60*    (2022.01)

(52) U.S. Cl.
CPC .............. *G06T 17/00* (2013.01); *G06V 10/60* (2022.01)

(58) Field of Classification Search
CPC ....... G06T 17/00; G06T 15/40; G06T 1/0007; G06T 3/4023; G06T 15/205; G06V 10/60; G06V 20/64
See application file for complete search history.

(56) References Cited

U.S. PATENT DOCUMENTS 6,760,024 B1    7/2004   Lokovic et al.
8,521,488 B2 *  8/2013   Kirby .................... G06F 17/175
                                                              703/2
(Continued)

FOREIGN PATENT DOCUMENTS

CN    102270339 A    12/2011
CN    103345771 A    10/2013
(Continued)

OTHER PUBLICATIONS

Y. Ohtake, A. Belyaev and H. P. Seidel, "A multi-scale approach to 3D scattered data interpolation with compactly supported basis functions," 2003 Shape Modeling International., Seoul, Korea (South), 2003, pp. 153-161, doi: 10.1109/SMI.2003.1199611. (Year: 2003).*

(Continued)

*Primary Examiner* — William A Beutel
*Assistant Examiner* — Chris Alejandro Puntier
(74) *Attorney, Agent, or Firm* — Morgan, Lewis & Bockius LLP

(57) ABSTRACT

The present disclosure provides a method for processing visibility data of a three-dimensional model performed by a computer device. The method includes: obtaining original values of visibility data of a plurality of sampling points of the three-dimensional model; determining visibility data of a plurality of vertexes of the three-dimensional model based on a first error function measuring differences between recovery values of the visibility data of the sampling points from interpolation of the visibility data of the vertexes of the three-dimensional model and the original values of the visibility data of the sampling points and change rates of the recovery values of the visibility data of the sampling points; and storing the visibility data of each vertex of the three-dimensional model. This method reduces the space for storing the visibility data, relieves the pressure of storing the (Continued)

visibility data, and improves the efficiency of rendering the three-dimensional model.

18 Claims, 11 Drawing Sheets

(56) References Cited

U.S. PATENT DOCUMENTS

| | | | |
|---|---|---|---|
| 9,536,344 B1 | | 1/2017 | Baszucki et al. |
| 2019/0228563 A1* | | 7/2019 | Maeda .................. H04N 23/60 |

FOREIGN PATENT DOCUMENTS

| | | |
|---|---|---|
| CN | 108038902 A | 5/2018 |
| CN | 109903385 A | 6/2019 |
| CN | 111563950 A | 8/2020 |
| CN | 112446919 A | 3/2021 |
| CN | 114399421 A | 4/2022 |

OTHER PUBLICATIONS

Alexa, M., Rusinkiewicz, S., Nehab, D., & Shilane, P. (Jun. 2004). Stratified point sampling of 3D models. In Proc. Eurographics Symp. on Point-Based Graphics (pp. 49-56). (Year: 2004).*
Zhang, Eugene, and Greg Turk. "Visibility-guided simplification." IEEE Visualization, 2002. VIS 2002 . . . IEEE, 2002.), (Year: 2002).*
Tencent Technology, ISR, PCT/CN2022/127985, Jan. 3, 2023, 2 pgs.
Tencent Technology, WO, PCT/CN2022/127985, Jan. 3, 2023, 5 pgs.
Tencent Technology, IPRP, PCT/CN2022/127985, May 2, 2024, 6 pgs.
Yutaka Ohtake et al., "A Multi-Scale Approach to 3D Scattered Data Interpolation with Compactly Supported Basis Functions", 2003 Shape Modeling International, May 2003, 9 pgs.

* cited by examiner

METHOD AND APPARATUS FOR STORING VISIBILITY DATA OF THREE-DIMENSIONAL MODEL, DEVICE, AND STORAGE MEDIUM

CROSS-REFERENCE TO RELATED APPLICATIONS

This application is a continuation application of PCT Patent Application No. PCT/CN2022/127985, entitled "METHOD AND APPARATUS FOR STORING VISIBILITY DATA OF THREE-DIMENSIONAL MODEL, DEVICE, AND STORAGE MEDIUM" filed on Oct. 27, 2022, which claims priority to (i) Chinese Patent Application No. 202111374336.0, entitled "METHOD AND APPARATUS FOR STORING VISIBILITY DATA OF THREE-DIMENSIONAL MODEL, DEVICE, AND STORAGE MEDIUM", filed on Nov. 19, 2021 and (ii) Chinese Patent Application No. 202111624049.0, entitled "METHOD AND APPARATUS FOR STORING VISIBILITY DATA OF THREE-DIMENSIONAL MODEL, DEVICE, AND STORAGE MEDIUM", filed on Dec. 28, 2021, all of which are incorporated herein by reference in its entirety.

FIELD OF THE TECHNOLOGY

Embodiments of this application relate to the field of computer and Internet technologies, and in particular, to a method and apparatus for processing visibility data of a three-dimensional model, a device, and a storage medium.

BACKGROUND OF THE DISCLOSURE

When the three-dimensional model is rendered, the computer device needs to calculate the visibility data of each point on the three-dimensional model and store the visibility data for use during model rendering.

In the related art, when calculating the visibility data of any point on the three-dimensional model, the computer device takes the point as a sphere center to launch multiple (for example, 720) rays and obtains intersection data of each ray depending on whether each ray intersects with an environmental object and an intersection distance, and the visibility data of the point includes the intersection data of each ray launched from the point.

However, in the above related art, because the visibility data of only one point on the three-dimensional model includes the intersection data of a large number of rays, the data volume of the visibility data of the three-dimensional model is too large. This is not conducive to storage and calculation, thus severely affecting the efficiency of rendering the three-dimensional model.

SUMMARY

Embodiments of this application provide a method and apparatus for processing visibility data of a three-dimensional model, a device, and a storage medium. The technical solutions are as follows:

According to an aspect of the embodiments of this application, a method for processing visibility data of a three-dimensional model is performed by a computer device and the method includes:

obtaining original values of visibility data of a plurality of sampling points of the three-dimensional model;

determining visibility data of a plurality of vertexes of the three-dimensional model based on a first error function measuring differences between recovery values of the visibility data of the sampling points from interpolation of the visibility data of the vertexes of the three-dimensional model and the original values of the visibility data of the sampling points and change rates of the recovery values of the visibility data of the sampling points; and storing the visibility data of each vertex of the three-dimensional model.

According to an aspect of the embodiments of this application, a computer device is provided, the computer device including a processor and a memory. The memory stores a computer program, and the computer program is loaded and executed by the processor and causes the computer device to perform the method for processing visibility data of a three-dimensional model.

According to an aspect of the embodiments of this application, a non-transitory computer-readable storage medium is provided. The storage medium stores a computer program, and the computer program is loaded and executed by a processor of a computer device and causes the computer device to perform the method for processing visibility data of a three-dimensional model.

The technical solutions provided in the embodiments of this application may include the following beneficial effects:

The original value of the visibility data of each sampling point of the three-dimensional model is obtained, and the use of the first error function allows a minimum difference degree between the recovery value of the visibility data of the sampling point obtained by interpolating visibility data of each vertex and the original value. That is, when the convergence of the first error function, the final result of the visibility data of each vertex of the three-dimensional model is obtained, and the visibility data of each vertex is stored without the need to store visibility data of a large number of sampling points. This substantially reduces the space used for storing the visibility data, thus relieving the pressure of storing the visibility data of the three-dimensional model, and improving the efficiency of rendering the three-dimensional model. In addition, the first error function is designed for measuring the difference degree between the recovery value and the original value of the visibility data of the sampling point. Convergence of the first error function can enable the difference degree between the recovery value and the original value of the visibility data of the sampling point to be as small as possible, such that the difference between a surface of the rendered three-dimensional model and a surface of the original three-dimensional model is as small as possible, ensuring the accuracy during three-dimensional model rendering. Moreover, the first error function is used for measuring the change rate of the recovery value of the visibility data of the sampling point. Convergence of the first error function can make the recovery values of the visibility data continuous, thus enhancing the visual effect of the surface of the three-dimensional model after visibility data rendering.

DESCRIPTION OF EMBODIMENTS

Figure 1:
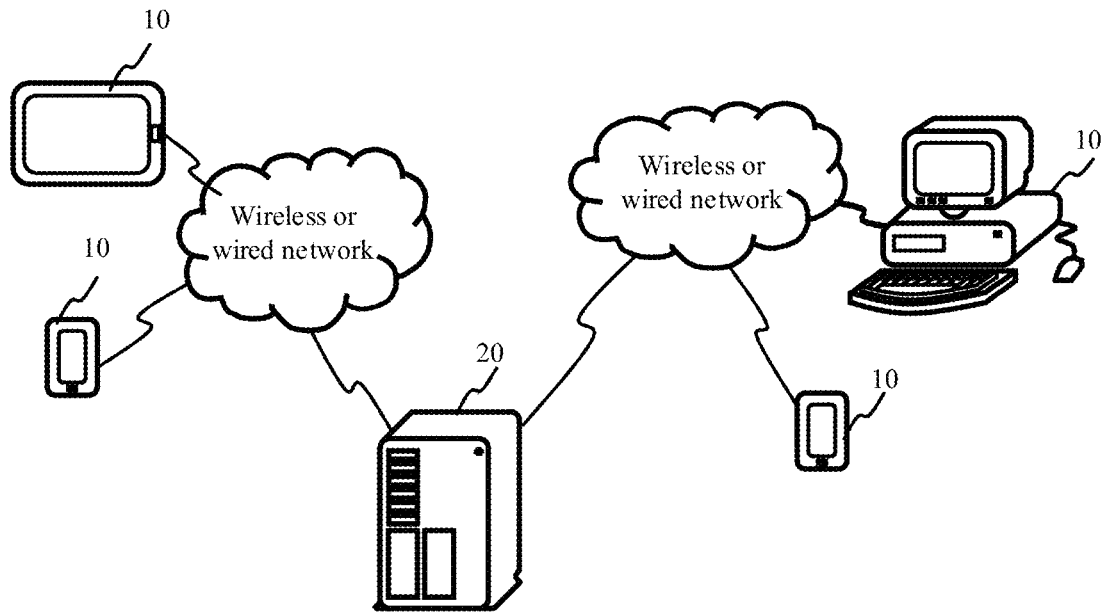
FIG. 1 is a schematic diagram of a solution implementation environment according to an embodiment of this application.

Referring to FIG. 1, FIG. 1 is a schematic diagram of a solution implementation environment according to an embodiment of this application. The solution implementation environment may include: a terminal 10 and a server 20.

The terminal 10 may be an electronic device such as a cell phone, a tablet computer, a personal computer (PC), a wearable device, a vehicle terminal device, a virtual reality (VR) device, an augmented reality (AR) device, or a smart TV. This is not limited in this application. A client running a target application is installed on the terminal 10. For example, the target application may be an application that needs to use three-dimensional model visibility data for model rendering, such as a game application, a three-dimensional map program, a social application, and an interactive entertainment application. This is not limited in this application. The game application may include an application corresponding to a shooting game, a battle flag game, or a multiplayer online battle arena (MOBA) game. This is not limited in this application.

In an example, the client of the target application can render the three-dimensional model based on the visibility data of the three-dimensional model to make the three-dimensional model more realistic. In some embodiments, the visibility data is obtained by sampling each pixel on the three-dimensional model. For example, a computer device (for example, the terminal 10 or server 20) samples each pixel on the three-dimensional model online or offline to obtain the visibility data of the three-dimensional model. The visibility data is used for representing the visibility of the entire three-dimensional model. The visibility can be used for describing the brightness of each part of the model in a scene (for example, a virtual scene), such that the three-dimensional model is more in line with the optical laws in the scene, thus enhancing the realism of the three-dimensional model in the scene and the visual experience of the user.

The server 20 may be a stand-alone physical server, a server cluster or distributed system formed by multiple physical servers, or a cloud server providing cloud computing services. The server 20 may be a backend server of the foregoing target application, to provide backend services for the clients of the target application. In some embodiments, the visibility data of the three-dimensional model can be stored in the server 20, and when the terminal 10 needs to render the three-dimensional model, the server 20 provides the corresponding visibility data for the terminal 10. For example, the server 20 can be used to sample the three-dimensional model, to obtain and store the visibility data of the three-dimensional model. Alternatively, the server 20 receives the visibility data from the terminal 10 and stores it. This is not limited in this application. In some embodiments, the visibility data of the three-dimensional model can also be stored in the terminal 10.

The terminal 10 can communicate with the server 20 via a network, which may be, for example, a wired network or a wireless network.

In some embodiments, the foregoing target application can provide a three-dimensional scene, where a three-dimensional model exists. The three-dimensional model may be a three-dimensional character model, a three-dimensional pet model, a three-dimensional carrier model, or the like. In addition, the three-dimensional model may be dynamic and perform activities in the scene, for example, moving or performing various other operations. The three-dimensional model may alternatively be static, for example, being a three-dimensional building model or a three-dimensional plant model.

Taking the game application as an example, the foregoing scene may be referred to as a virtual scene, and the three-dimensional model may be a virtual character, a virtual building, a virtual pet, or the like in the game.

The virtual scene is a scene displayed (or provided) when the client of the target application (for example, a game application) is running on the terminal. The virtual scene is a scene created for virtual characters to perform activities (for example, game competitions), such as a virtual house, a virtual island, or a virtual map. The virtual scene may be a simulation scene of the real world, a half-simulation and half-fictional scene, or a purely fictional scene. The virtual scene may be a three-dimensional virtual scene. When the client of the target application is running on the terminal, different virtual scenes can be displayed (or provided) in different time periods.

The three-dimensional model may be any model in the virtual scene, such as a character model, an animal model, a building model, or a landform model. In some examples, the foregoing client can adopt the technical solution provided in the embodiments of this application, to obtain the visibility data of the three-dimensional model and store it, and when rendering the three-dimensional model, the client can obtain the visibility data of the three-dimensional model from the stored data for use.

Figure 2:
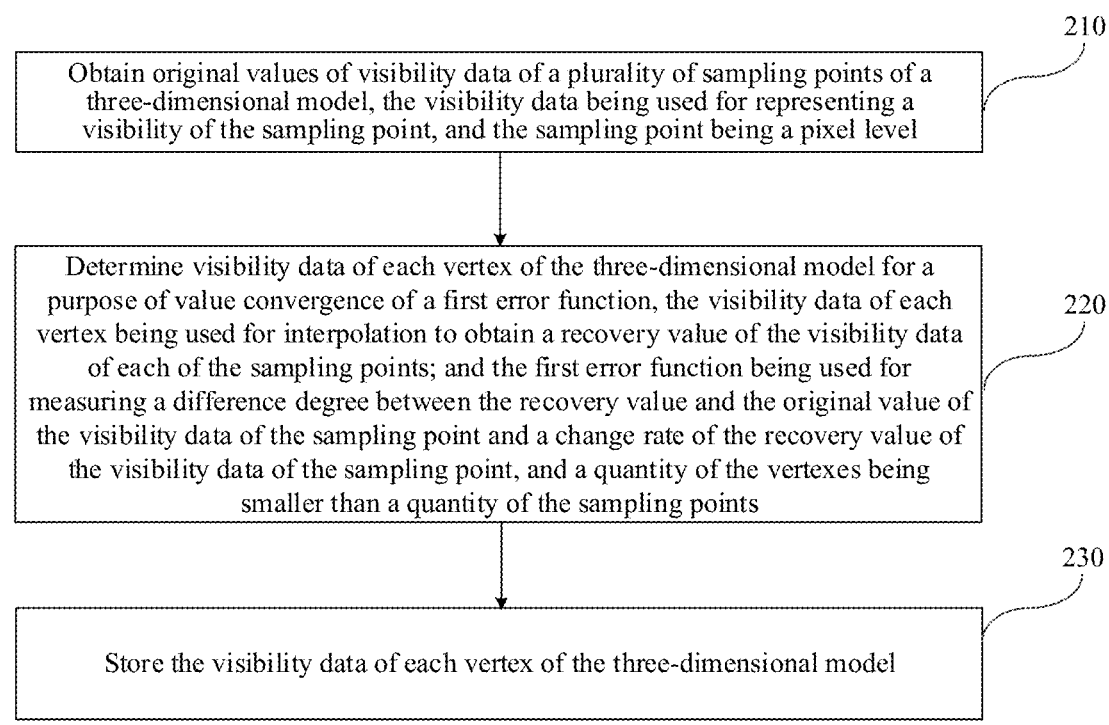
FIG. 2 is a flowchart of a method for processing visibility data of a three-dimensional model according to an embodiment of this application.

Referring to FIG. 2, FIG. 2 is a flowchart of a method for processing visibility data of a three-dimensional model according to an embodiment of this application. The execution subject of the steps of the method may be a computer device. For example, the computer device may be a terminal 10 or a server 20 in the solution implementation environment in FIG. 1. The method may include at least one of the following steps (210 to 230):

Step 210: Obtain original values of visibility data of a plurality of sampling points of the three-dimensional model. The visibility data is used for representing a visibility of the sampling point, and the sampling point is a pixel level.

The sampling points are points on the surface of the three-dimensional model. The plurality of sampling points can be obtained by sampling points on the surface of the three-dimensional model, and then the visibility data of the plurality of sampling points is obtained through sampling. The sampling points are pixel-level sampling points, that is, all pixels on the model can be sampled, and the sampling point can be any point on the surface of the three-dimensional model. The size of the pixel is not limited in this embodiment of this application. For example, the size of the pixel (also referred to as a voxel in a three-dimensional image) in this embodiment of this application may be 0.1 mm to 1 mm. In this embodiment of this application, the visibility data obtained by directly sampling to-be-sampled points is the original value, and the original value refers to the real visibility data of the sampling points on the surface of the three-dimensional model. The three-dimensional model is the same as that described in the foregoing embodiment and will not be described herein again.

The visibility data is used for representing the visibility of the sampling point, and the visibility of the sampling point is used for indicating whether the sampling point can be observed in all directions. After the data in all directions is recorded and integrated, the visibility data of the sampling point can be obtained. For example, the visibility data may further be used for representing information of objects around the sampling point blocking the sampling point, and the visibility data is spherically distributed with respect to the sampling point.

Step 220: Determine visibility data of each vertex of the three-dimensional model via value convergence of a first error function. The visibility data of each vertex is used for interpolation to obtain a recovery value of the visibility data of each of the sampling points. The first error function is used for measuring a difference degree between the recovery value and the original value of the visibility data of the sampling point and a change rate of the recovery value of the visibility data of the sampling point, and a quantity of the vertexes is smaller than a quantity of the sampling points.

In this embodiment of this application, the vertex is a point on a surface grid of the three-dimensional model, and the surface grid of the three-dimensional model is formed by a plurality of surface slices, and a polygon formed by a plurality of vertexes is referred to as a surface slice. The surface slice is a data structure used for creating the above-described three-dimensional model, such as, a data structure obtained after the surface grid of the three-dimensional model is segmented, and each surface slice is in an arbitrary shape, which may be a triangle or other polygons. The triangle-shaped surface slice is referred to as a triangular surface slice.

The sampling point is any point in the three-dimensional model, and the vertex is the vertex on the surface slice obtained after the three-dimensional model is segmented by grids. Therefore, a corresponding sampling point necessarily exists in the position of each vertex, then the visibility data of the vertex can be determined by the original value of the visibility data of the sampling point corresponding to the position of the vertex.

In some embodiments, interpolation is performed based on the visibility data of the vertex of the three-dimensional model, to obtain the recovery value of the visibility data of each sampling point in the surface slice formed by the vertexes of the three-dimensional model. The recovery value of the visibility data is an interpolation (that is, an estimated value), which may be the same as or different from the original value of the visibility data. In some embodiments, a quantity of the sampling points in the surface slice formed by vertexes of the three-dimensional model is greater than that of the vertexes of the three-dimensional model. In some embodiments, the sampling points in the surface slice formed by the vertexes of the three-dimensional model include the vertexes of the three-dimensional model. In this embodiment of this application, the first error function is used for measuring a difference degree between the recovery value and the original value of the visibility data of the sampling point and a change rate of the recovery value of the visibility data of the sampling point. The difference degree represents a magnitude relationship between the recovery value and the original value of the visibility data of the sampling point. The change rate represents the continuity of the recovery values of the visibility data of adjacent sampling points. A lower change rate indicates a higher continuity of the recovery values of the visibility data of adjacent sampling points. In this embodiment of this application, the final result of the visibility data of each vertex of the three-dimensional model is determined via value convergence of a first error function. The manner of taking the value of the first error function is not limited in this application. A specific form of the first error function is described in the following embodiments.

In an example, step 220 can include the following steps (221 and 222).

Step 221: Construct the first error function based on the recovery value and the original value of the visibility data of the sampling point. A value of the first error function is positively correlated with the difference degree between the recovery value and the original value of the visibility data of the sampling point, and the value of the first error function is positively correlated with the change rate of the recovery value of the visibility data of the sampling point.

The first error function may be denoted as E(x), which can be used for representing the difference degree between the recovery value and the original value of the visibility data of the sampling point, and expressed with a specific formula as follows:

$$E(x) = \int_S (f(p) - g(p))^2 dp + \alpha \int_{t,u} \|\nabla g(p)_{1,t} - \nabla g(p)_{1,u}\|^2 dp,$$
where f(p) represents the original value of the visibility data, g(p) represents the recovery value of the visibility data, p represents any sampling point on the surface of the three-dimensional model, S represents a surface of the three-dimensional model, and α represents a weight parameter.

In some embodiments, Step 221 can include the following steps (221a to 221c):

Step 221a: Construct a first sub-function based on a difference between the recovery value and the original value of the visibility data of the sampling point. A value of the first sub-function is positively correlated with the difference degree between the recovery value and the original value of the visibility data of the sampling point.

The first sub-function represents the difference degree between the recovery value and the original value of the visibility data of each sampling point. The first sub-function may be a sum of the differences between the recovery values and the original values of the visibility data of the sampling points or a sum of the squares of the differences between the recovery values and the original values of the visibility data of the sampling points. This is not limited in this application. In this embodiment of this application, the first sub-function E1(x) is the sum of the squares of the differences between the recovery values and the original values of the visibility data of the sampling points and expressed with a specific formula as follows:

$$E1(x)=\int_S (f(p)-g(p))^2 dp.$$

Figure 3:
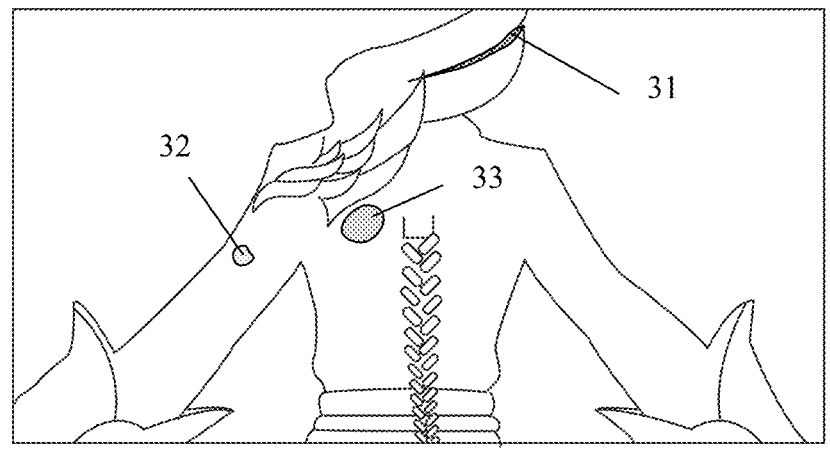
FIG. 3 is a schematic diagram of a rendered model according to an embodiment of this application.

In some embodiments, the visibility data of each vertex of the three-dimensional model can be determined via the convergence of the first sub-function. For example, as shown in FIG. 3, FIG. 3 shows a rendering effect of visibility data obtained by processing the three-dimensional model 31 only using the first sub-function. Obviously, the rendering effect has some defects that cannot be ignored. There is a fault in the black and white intersection between a region 32 and a region 33 corresponding to the three-dimensional model 31, showing that the region is relatively dirty with poor visual effects. Therefore, in this embodiment of this application, when the first error function is constructed, the change rate of the recovery value of the visibility data of the sampling point is also considered, to resolve the fault problem. In this embodiment of this application, the problem can be resolved by performing the following steps:

Step 221b: Construct a second sub-function based on a difference between change rates corresponding to at least a set of adjacent surface slices on the three-dimensional model. A change rate corresponding to a target surface slice on the three-dimensional model is a change rate of a recovery value of visibility data of each sampling point within the target surface slice. A value of the second sub-function is positively correlated with the change rate of the recovery value of the visibility data of the sampling point.

The second sub-function is used for representing a difference degree of change rates corresponding to each set of adjacent surface slices on the three-dimensional model, where the adjacent surface slices may be two surface slices sharing an edge. The second sub-function may be a sum of differences of change rates corresponding to sets of adjacent surface slices or a sum of squares of absolute differences of change rates corresponding to sets of adjacent surface slices. This is not limited in this application. In this embodiment of this application, the second sub-function E2(x) is the sum of squares of absolute differences of change rates corresponding to sets of adjacent surface slices and expressed with a specific formula as follows:

$$E2(x)=\alpha \int_{t,u} \|\nabla g(p)|_t - \nabla g(p)|_u\|^2 dp, \text{ where}$$

t,u represents any set of adjacent surface slices. Two surface slices, if sharing an edge, can be used as a set of adjacent surface slices.

Step 221c: Construct the first error function based on the first sub-function and the second sub-function.

The above-described first sub-function E1(x) is combined with the second sub-function E2(x) to obtain the first error function E(x). For example, the sum of the first sub-function and the second sub-function is determined as the first error function, and the first error function can be expressed as follows:

$$E(x)=E1(x)+E2(x).$$

Step 222: Determine the visibility data of each vertex of the three-dimensional model via minimizing the value of the first error function.

When the value of the first error function is minimum, the difference degree between the recovery value and the original value of the visibility data of each sampling point is minimum. In this case, a recovery value most approximate to the original value of the visibility data can be obtained, guaranteeing the accuracy of recovery data, thus improving the accuracy of rendering the three-dimensional model. In addition, when the value of the first error function is minimum, the difference degree of change rates corresponding to each set of adjacent surface slices is minimum. In this case, adjacent surface slices with the change rate as small as possible can be obtained, making the continuity of the visibility data between adjacent surface slices high, thus ensuring high continuity of the overall visibility data, and guaranteeing the visual effect of the rendered three-dimensional model.

In other words, the visibility data of each vertex of the three-dimensional model can be determined via converging the minimum of the first error function. In this case, a smaller difference degree between the recovery value and the original value of the visibility data of the sampling point and a smaller change rate of the recovery value of the visibility data of the sampling point indicate higher accuracy and continuity of the visibility data of the vertex.

For example, when the value of the first error function is decreased during measurement, the visibility data of each vertex is updated continuously, and the value of the first error function is measured continuously until the value of the first error function is increased. In this case, the value of the first error function obtained from the last measurement is the minimum of the first error function, and the visibility data of each vertex with this minimum is the final visibility data of each vertex.

In some embodiments, a minimum threshold is set for the value of the first error function. When the measured value of the first error function is smaller than the threshold, the measurement is stopped, and the visibility data of each vertex at this moment is determined as the final visibility data of each vertex.

In some practicable embodiments, a purpose of converging the maximum of the first error function can also be made. In this case, the first error function is used for measuring the proximity between the recovery value and the original value of the visibility data of the sampling point. A higher proximity indicates a smaller difference degree between the recovery value and the original value of the visibility data of the sampling point.

Step 230: Store the visibility data of each vertex of the three-dimensional model.

In some embodiments, the final result of the visibility data of each vertex of the three-dimensional model obtained in the foregoing step can be stored in the vertex data of the three-dimensional model. The vertex data of the three-dimensional model includes vertex data corresponding to each vertex, and the vertex data corresponding to each vertex includes visibility data of the vertex. In some embodiments, the vertex data corresponding to each vertex may further include position data of the vertex, color data of the vertex, or the like. This is not limited in this application.

In summary, in this embodiment, the original value of the visibility data of each sampling point of the three-dimensional model is obtained, and the use of the first error function allows a minimum difference degree between the recovery value of the visibility data of the sampling point obtained through interpolation on the visibility data of each vertex and the original value. That is, when the convergence of the first error function, the final result of the visibility data of each vertex of the three-dimensional model is obtained, and the visibility data of each vertex is stored without the need to store visibility data of a large number of sampling points. This substantially reduces the space used for storing the visibility data, thus relieving the pressure of storing the visibility data of the three-dimensional model, and improving the efficiency of rendering the three-dimensional model. In addition, the first error function is designed for measuring the difference degree between the recovery value and the original value of the visibility data of the sampling point. Convergence of the first error function can enable the difference degree between the recovery value and the original value of the visibility data of the sampling point to be as small as possible, such that the difference between a surface of the rendered three-dimensional model and a surface of the original three-dimensional model is as small as possible, ensuring the accuracy during three-dimensional model rendering. Moreover, the first error function is used for measuring the change rate of the recovery value of the visibility data of the sampling point. Convergence of the first error function can make the recovery values of the visibility data continuous, thus enhancing the visual effect of the surface of the three-dimensional model after visibility data rendering.

The following illustrates the process of constructing and solving the first error function.

Without considering the continuity of visibility data between surface slices, the first error function is formed by only the first sub-function. In this case, the recovery values of the visibility data of all sampling points in the target surface slice enclosed by target vertexes can be obtained according to an interpolation function based on the visibility data of the target vertexes. The target vertex may be a vertex corresponding to the target surface slice, and the target surface slice may be any surface slice corresponding to the three-dimensional model.

The interpolation function may include discrete points and table of corresponding function values or file definition, and the interpolation function is a function that calculates vacant data between two pieces of data for filling.

Figure 4:
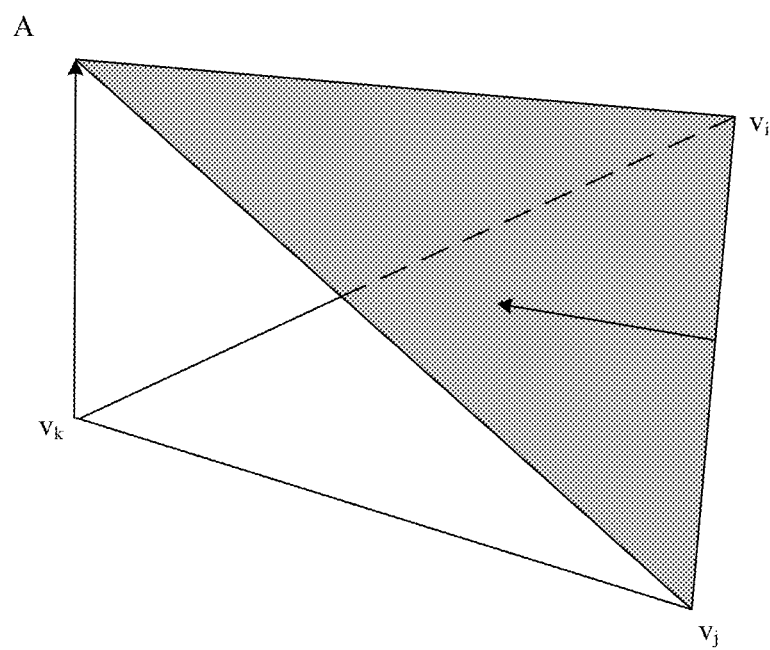
FIG. 4 is a schematic diagram of an interpolation function according to an embodiment of this application.
Figure 5:
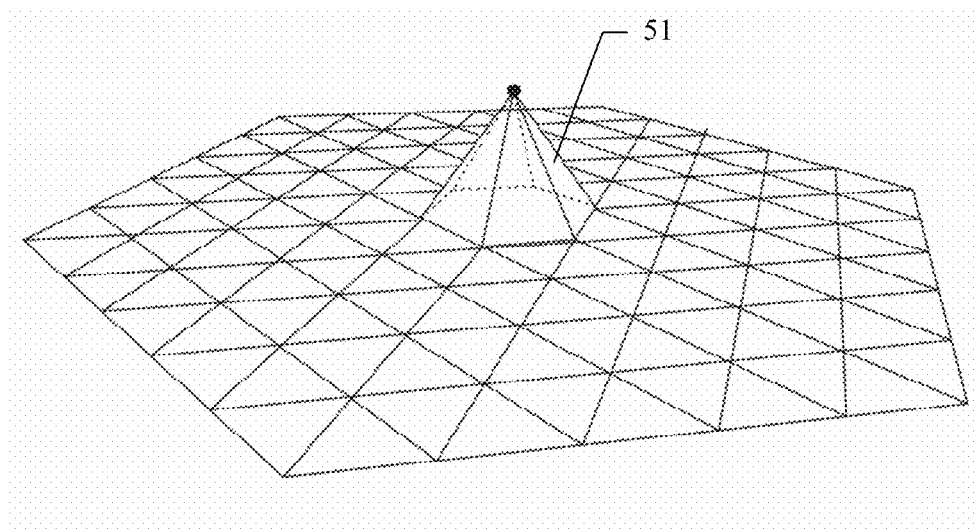
FIG. 5 is a schematic diagram of an interpolation function according to another embodiment of this application.

In some embodiments, as shown in FIG. 4, it can be known in FIG. 4 that the value of point A is 1, values of points $V_i$, $V_j$, and $V_k$ are all 0, and values of points on segments $AV_i$, $AV_j$, and $AV_k$ can be obtained using the interpolation function. The points on the segments $AV_i$, $AV_j$, and $AV_k$ have values that are continuous, and as these points are closer to A, their values are more approximate to 1 and not greater than 1. Similarly, as they are closer to $V_i$, $V_j$, and $V_k$, their values are more approximate to 0 and not smaller than 0. Similarly, the interpolation function can also be used in other graphs, as shown in FIG. 5. FIG. 5 illustrates application of an interpolation function for a hexagon 51, the specific operation method being the same as that in FIG. 4. This is not described herein again.

The recovery value, obtained using the interpolation function, of the visibility data of any point p in the surface slice is expressed as follows: $g(p)=\Sigma_{i=1}^{N}B_i(p)x_i$, where $x_i$ represents visibility data of a sampling point corresponding to a vertex i of the surface slice, $B_i(p)$ represents an expression of the interpolation function, and N represents a total number of the vertexes of the surface slice.

It can be known from the above that the formula of the first sub-function is expressed as follows: $E(x)=\int_S (f(p)-g(p))^2 dp$.

$g(p)=\Sigma_{i=1}^{N}B_i(p)x_i$ is brought into $E(x)=\int_S (f(p)-g(p))^2 dp$ to obtain:

$E(x)=\int_S (f(p)-\Sigma_{i=1}^{N}B_i(p)x_i)^2 dp;$ $E(x)=\int_S \Sigma_{i=1}^{N}B_i(p)x_i\Sigma_{j=1}^{N}B_j(p)x_j dp - \int_S f(p)\Sigma_{i=1}^{N}B_i(p) x_i dp + \int_S f(p)^2 dp;$ and $E(x)=\Sigma_{i=1}^{N}\Sigma_{j=1}^{N}x_ix_j\int_S B_i(p)B_j(p)dp - \Sigma_{i=1}^{N}x_i\int_S f(p)B_i(p)dp + \int_S f(p)^2 dp.$ It can be learned that the first term in the foregoing formula is a quadratic term of x, the second term is a primary term of x, the third term is a constant ($f(p)^2$ is known), and j is a vertex, in this surface slice, different from vertex i. Therefore, the formula of the above-described first sub-function is expressed in a matrix form as follows: $E(x)=x^T A x - 2 x^T b + c$, where
$A_{i,j}=\int_S B_i(p)B_j(p)dp$, $b_i=\int_S B_i(p)f(p)dp$, $c=\int_S f(p)^2 dp$, $A_{i,j}$ represents a matrix, $b_i$ represents a vector, and c represents a constant obtained through calculation.

The minimum of E(x) is calculated and the value of x is calculated when the minimum of E(x) is taken.

According to the calculation formula of E(x), if the matrix A is a sparse symmetric positive definite matrix, the above-described first sub-function is a monotonically increasing function, and when its slope is equal to 0, the minimum is taken. To be specific, when all $$\frac{\partial E(x)}{\partial x_i}$$

are taken as 0, the optimal solution of the above-described first sub-function is obtained, such that the matrix form of the calculation formula for taking the minimum of E(x) can be simplified as follows: $Ax=b$.

In this case, the obtained vertex visibility data corresponding to x is vertex visibility data to be stored by the three-dimensional model. However, the foregoing method (the least-square method) is prone to over-fitting problems, so it is also necessary to consider the continuity between adjacent surface slices.

In the case of considering the continuity between adjacent surface slices, a regular term needs to be added. The matrix form of the calculation formula after the addition of the regular term is expressed as follows: $(A+\alpha R)x=b$, where a matrix R is the regular term, and R does not affect the absolute value of x obtained through calculation. The regular term is introduced to neutralize the above over-fitting problem, so that the interpolation function obtains a value approximate to the original value, while the form of the function is to be relatively "smooth". That is, the gradient of the interpolation function of the target vertex is to be as consistent as possible with that of the interpolation function of the point. According to the foregoing condition, the first sub-function can be updated as follows:

$$E(x)=\int_S (f(p)-g(p))^2 dp + \alpha \int_{t,u} \|\nabla g(p)|_t - \nabla g(p)|_u\|^2 dp,$$
where $\nabla g(p)|_t$ represents a change rate of a triangular surface slice t, and $\nabla g(p)|_u$ represents a change rate of a triangular surface slice u.

Based on the magnitude of the global gradient difference of the interpolation functions, the formula for the global gradient difference of the interpolation functions is obtained as follows:

$\nabla g(p) = x_i \nabla B_i(p) + x_j \nabla B_j(p) + x_k \nabla B_k(p)$: i, j, and k respectively represent three vertexes of the triangular surface slice.

The expression manner of the global gradient of the difference function can be obtained based on the gravity center value of the interpolation function.

$B_i(p)$ is set as the gravity center point with respect to $v_i$ and expressed with the following formula:

$$B_i(p) = \frac{\text{area}(v_j, v_k, p)}{\text{area}(v_i, v_j, v_k)} = \frac{\|E_i\| h_i}{2a_t},$$

where $a_t$ represents an area of the triangular surface slice, only $h_i$ represents a variable in the formula, so $B_i(p)$ is the function of the $h_i$, and $E_i$ represents a length of an opposite side of the vertex i in the triangular surface slice.

Further, $$\nabla B_i(p) = \frac{d}{dh_i}\left(\frac{\|E_i\| h_i}{2a_t}\right) u_i = \frac{\|E_i\|}{2a_t} u_i,$$

where $u_i$ represents a direction of $\nabla B_i(p)$, so $$\nabla g(p) = \frac{\|E_i\|}{2a_t} u_i x_i + \frac{\|E_j\|}{2a_t} u_j x_j + \frac{\|E_k\|}{2a_t} u_k x_k.$$

In order to express the integral in the matrix form, $\nabla g(p)$ is also expressed in the matrix form. It can be known from the foregoing formula that $\nabla g(p)$ represents the linear function of $x_i, x_j, x_k$, and therefore can be expressed as follows:

$$\nabla g(p) = \begin{bmatrix} m_{11} & \cdots & m_{1N} \\ m_{21} & \cdots & m_{2N} \\ m_{31} & \cdots & m_{3N} \end{bmatrix} * \begin{bmatrix} x_1 \\ x_2 \\ \vdots \\ x_{N-1} \\ x_{N-2} \end{bmatrix},$$

where a value of an element related to $x_i, x_j, x_k$ in the first matrix is non-zero, and is simplified as follows: $\nabla g(p) = Fx$.

According to the expression manner of the global gradient of the interpolation function, the regular term is obtained through calculation as follows:

$$\alpha \int_{t,u} \|\nabla g(p)|_t - \nabla g(p)|_u\|^2 dp =$$

$$\alpha \sum_{t,u} (a_t + a_u) \|\nabla g(p)|_t - \nabla g(p)|_u\|^2 =$$

$$\alpha \sum_{t,u} (a_t + a_u) \|F_t x - F_u x\|^2 = \alpha \sum_{t,u} (a_t + a_u) x^T (F_t - F_u)^T (F_t - F_u) x.$$

Therefore, the regular term matrix is:

$R = (F_t - F_u)^T (F_t - F_u).$

The following formula is brought into the matrix form of the calculation formula for taking the minimum of E(x) with the regular term for calculation to obtain the vertex visibility data corresponding to x, that is, the vertex visibility data to be stored by the three-dimensional model.

Figure 6:
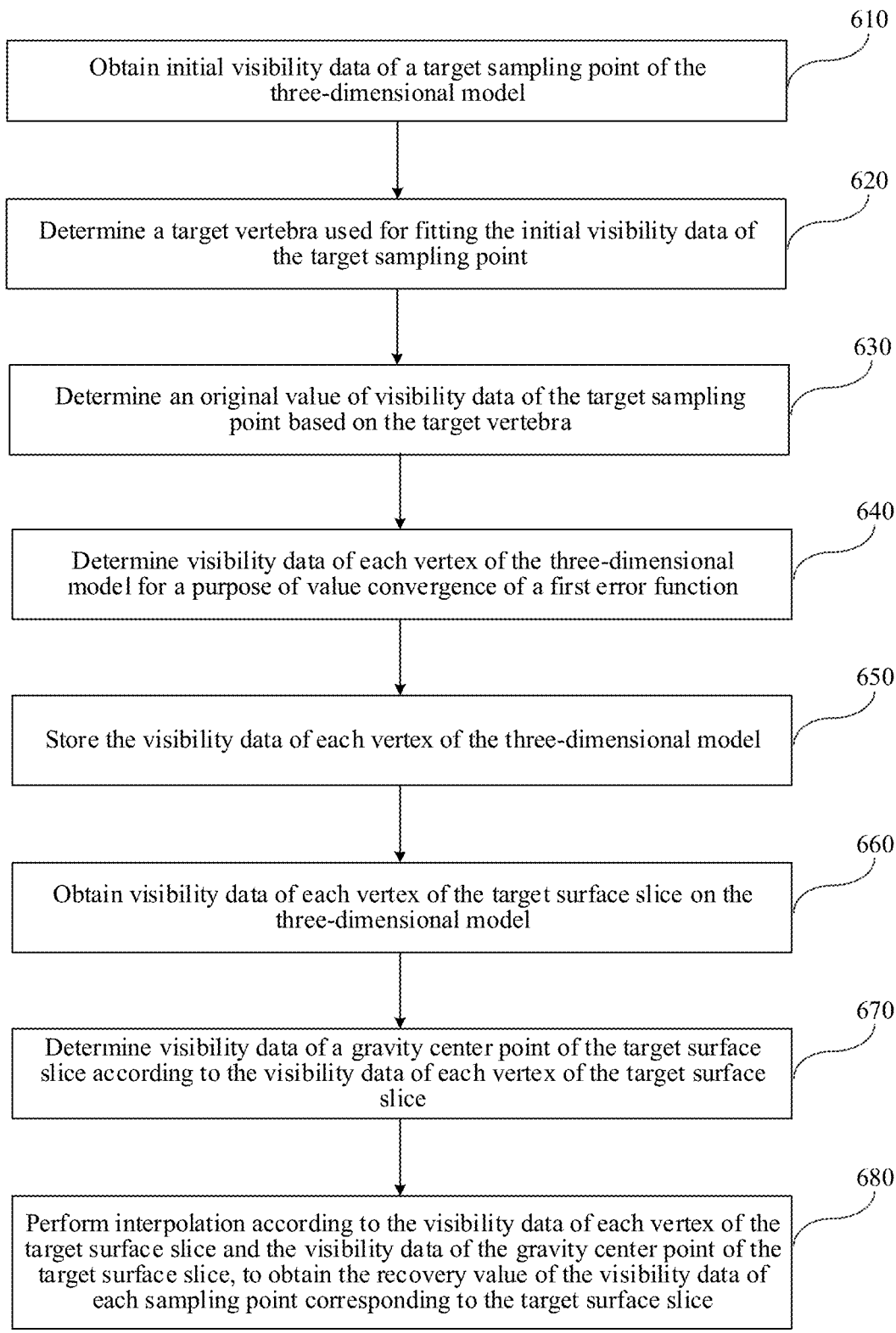
FIG. 6 is a flowchart of a method for processing visibility data of a three-dimensional model according to another embodiment of this application.

Referring to FIG. 6, FIG. 6 is a flowchart of a method for processing visibility data of a three-dimensional model according to another embodiment of this application. The execution subject of the steps of the method may be a computer device. For example, the computer device may be a terminal 10 or a server 20 in the solution implementation environment in FIG. 1. The method may include at least one of the following steps (610 to 680):

Step 610: Obtain initial visibility data of a target sampling point of the three-dimensional model.

The target sampling point may be any sampling point corresponding to the three-dimensional model. The initial visibility data of the target sampling point includes: intersection data of the target sampling point used as a sphere center in a plurality of directions. For a target direction in a plurality of directions, intersection data in the target direction is used for indicating whether a ray emitted from a target sampling point along the target direction intersects an environmental object and the intersection distance. In the case that the ray emitted from a target sampling point along the target direction intersects the environmental object, the intersection distance is further obtained. The intersection distance is the distance between the vertex (that is, the target sampling point) and the intersection point (that is, the intersection point between the ray along the target direction and the environmental object).

Figure 7:
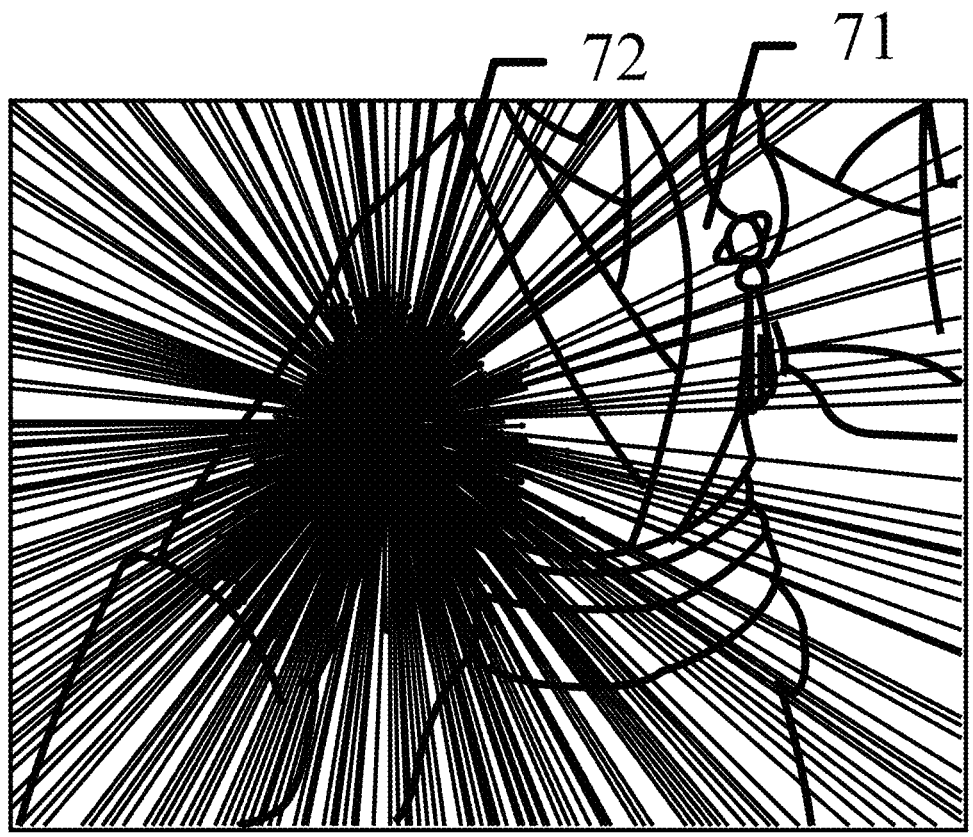
FIG. 7 is a schematic diagram of visibility data of a sampling point according to an embodiment of this application.

In some embodiments, as shown in FIG. 7, the target sampling point selected from FIG. 7 is a point 72 below the armpit of a character model 71. This is only to clearly describe the specific expression form of the visibility data of the target sampling point herein. However, in practice, the selected target sampling point is located on only the surface of the character model 71. The point 72 under the armpit of the character model 71 in FIG. 7 emits a large number of rays in all directions outward, which are indicated by the thin and thick lines in the figure. The thin line indicates that a ray in a direction intersects no object, and the thick line indicates that a ray in a direction intersects another object. The length of the thick line is the intersection distance. Visibility data is formed by data corresponding to the thin line and the thick line. The thin line data includes direction and data determined with no intersection, and the thick line data includes direction, data determined with intersection, and an intersection distance.

Obviously, a larger quantity of rays emitted by the sampling points indicates more accurate visibility data obtained of the sampling points and a bigger space required for storing the visibility data of the sampling points.

Step 620. Determine a target vertebra used for fitting the initial visibility data of the target sampling point.

Figure 8:
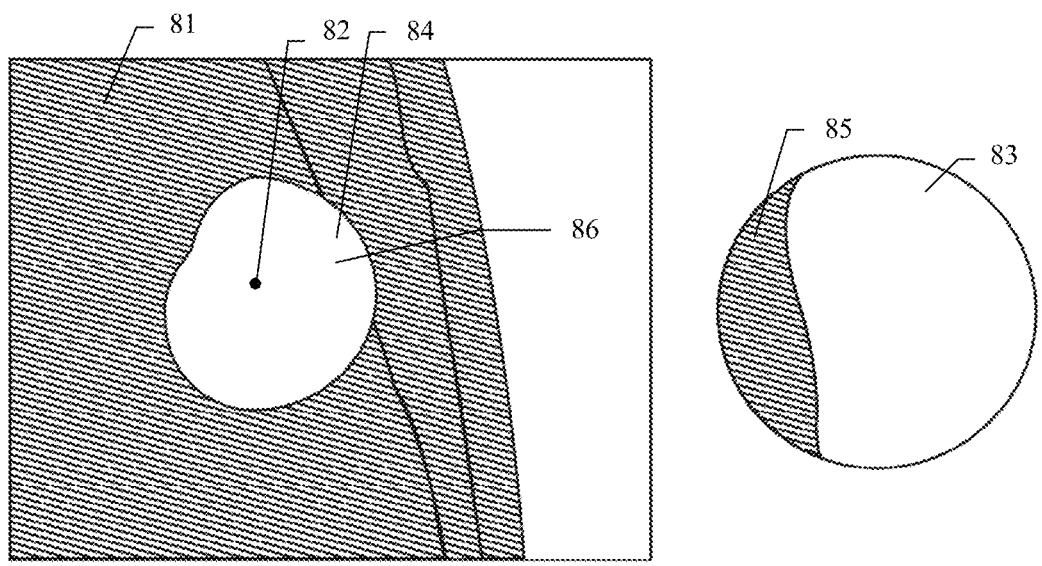
FIG. 8 is a schematic diagram of visibility data of a sampling point according to another embodiment of this application.

In some embodiments, as shown in FIG. 8, visibility data sampling is performed on the sampling points 82 of the character model 81. The sphere 83 in the right figure is obtained after sampling, that is, the sphere 84 (used for representing the initial visibility data of the sampling point 82) in the left figure. It is obvious to see that the region 85 of the sphere 83 is black, indicating the region 85 is invisible, that is, a part of the sphere 84 overlapping the character model 81. Therefore, only the visibility information of the region 86 without overlapping needs to be considered. Obviously, the region 86 and the center of the sphere 84 can form a vertebra. The vertebra is used for representing the visibility data of the sampling point 82, and is the target vertebra corresponding to the sampling point 82. The target vertebra is used for equivalently representing initial visibility data of the sampling point, and the initial visibility data is distributed on a sphere surface. If the sphere surface is observed from an angle of a user, only part of the sphere surface is observed at a moment, so that the sphere is equivalent to a vertebra.

The target vertebra is represented by only three pieces of data, namely, a central axis direction, an opening angle, and a scaling value of the target vertebra. The central axis direction is used for representing an opening direction of the target vertebra, that is, a direction of a region, not covered by an environmental object, of the visibility data of the sampling point. The opening angle is used for representing a size of the target vertebra, that is, a size of a region, not covered by an environmental object, of the visibility data of the sampling point. The scaling value is used for representing the brightness of the target vertebra, that is, a ratio of a visible region to a region, not covered by an environmental object, of the visibility data of the sampling point.

In some embodiments, the central axis direction of the target vertebra is represented using 2 floating-point numbers, the opening angle of the target vertebra is represented using 1 floating-point number, and the scaling value of the target vertebra is represented using 1 floating-point number.

The floating-point number is a numerical representation of a number that belongs to a specific subset of rational numbers and is used in computers for approximately representing any real number. Specifically, this real number is obtained by multiplying an integer or a fixed number (for example, a mantissa) by an integer power of a radix (typically 2 in computer), and this representation method is similar to the scientific counting method with a radix as 10. The floating-point number represents a number using the scientific counting method and can be expressed in this format: $V=(-1)^S*M*R^E$, where each variable has the following meaning:
- S: a sign bit, having a value of 0 or 1 and determining the sign of a number, where 0 represents positive and 1 represents negative;
- 'M': a mantissa, expressed by a decimal. For example, in $8.345*10^0$, 8.345 is the mantissa;
- R: a radix, when indicating a decimal number R, being 10, and when indicating a binary number R, being 2; and
- E: an exponent, expressed by an integer. For example, in $10^{-1}$, −1 is the exponent.

In this embodiment of this application, a vertebra in space is represented using 4 floating-point numbers, further reducing the calculation amount of the original values of the visibility data, and thus improving the efficiency of obtaining the original values of the visibility data.

Figure 9:
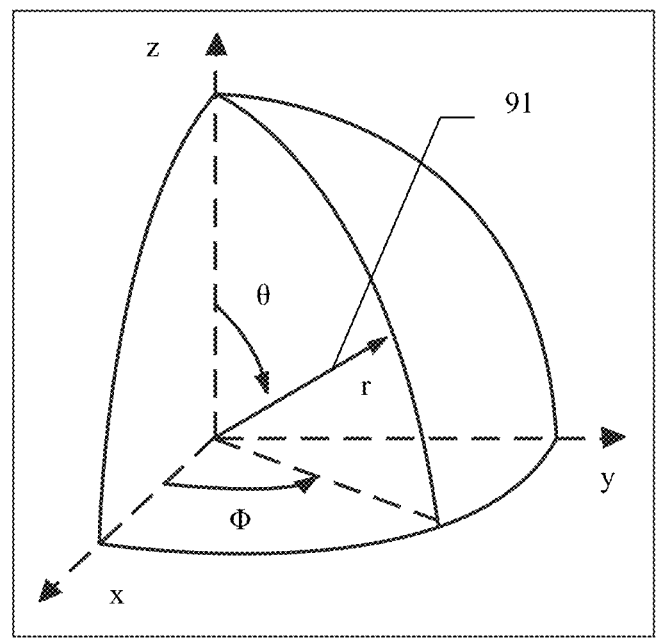
FIG. 9 is a schematic diagram of a central axis direction according to an embodiment of this application.

In some embodiments, as shown in FIG. 9, a ray 91 in FIG. 9 is the central axis direction of the target vertebra, and the central axis direction of the target vertebra can be obtained at two angles (for example, angle θ and angle φ in the figure). The two angles correspond to the foregoing two floating-point numbers.

Figure 10:
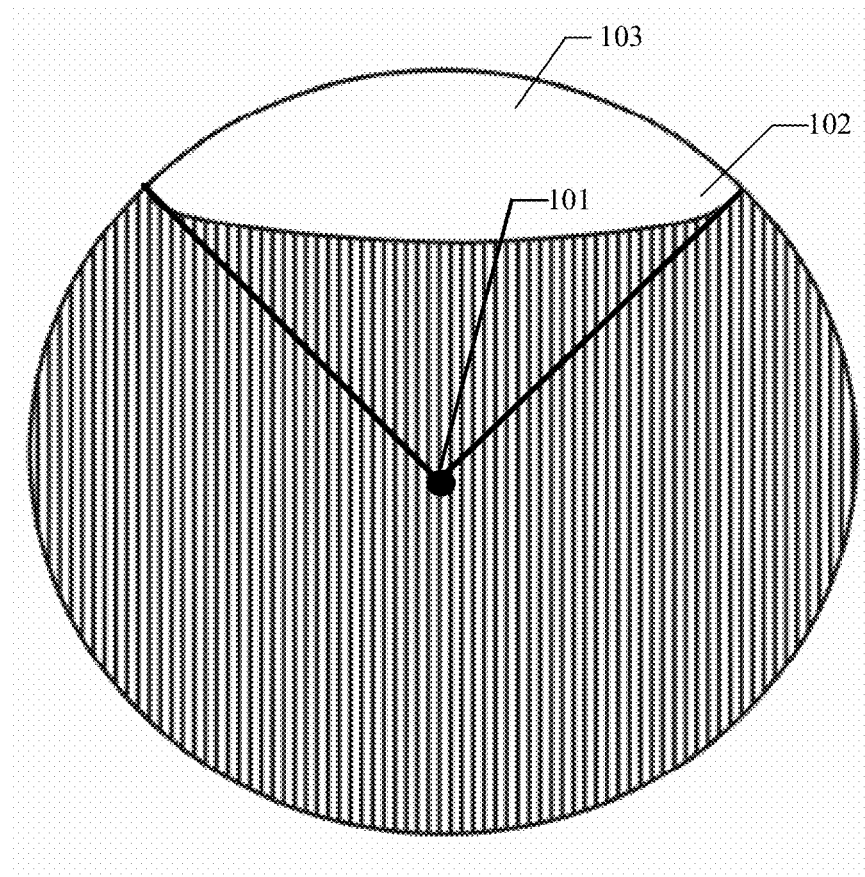
FIG. 10 is a schematic diagram of a target vertebra according to an embodiment of this application.

As shown in FIG. 10, a point 101 is the center of the sphere (representing the original value of the visibility data), and the graph 102 intercepted at a corresponding opening angle selected from the center 101 is the target vertebra, where the target vertebra 102 is a vertebra with a sphere center 101 as the vertex and a partial sphere surface as the bottom surface. Fitting the original value of the visibility data of the target sampling points obtained above to the target vertebra can reduce the loss of the original value of the visibility data, thus ensuring the accuracy of the visibility data as much as possible. In addition, the data corresponding to the vertebra is much smaller than the data corresponding to the sphere, thus further reducing the amount of visibility data. This helps to reduce the space required for storing the visibility data.

In some embodiments, according to the original value of the visibility data of the target sampling point, the visible part in the figure is set to 1, such as the white region 103, and the invisible part is set to 0, such as the underlined part in the figure, where the intersection distance is not shown in the figure. In some embodiments, the intersection distance may be set by the brightness of the color. For example, the brightness of the target vertebra is correlated with the intersection distance. A closer intersection distance indicates a smaller brightness of a corresponding position of the target vertebra, and a farther intersection distance indicates a greater brightness of the corresponding position of the target vertebra.

Figure 11:
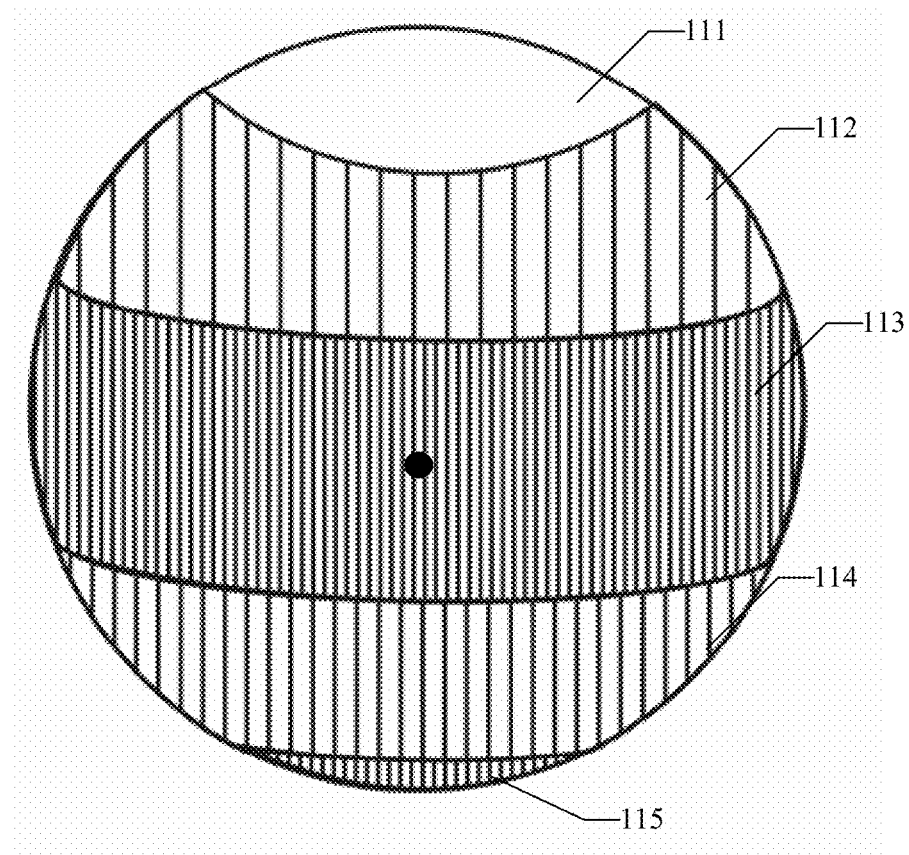
FIG. 11 is a schematic diagram of a projected target vertebra according to an embodiment of this application.

In some embodiments, as shown in FIG. 11, the spacing of lines is used for representing the brightness of the target vertebra. Specifically, the smaller spacing of the lines indicates a smaller brightness of the target vertebra. The region 111 is fully visible, the regions 112 and 114 are invisible and have a large intersection distance, and regions 113 and 115 are invisible and have a small intersection distance. Each region represents an average value of visibility information in the region. In some embodiments, different brightnesses can be set according to various sampling points in the target vertebra. The manner of setting the brightness of the target vertebra is not limited in this application.

In some embodiments, step 620 includes the following steps (621 to 624):

Step 621: Project the initial visibility data of the target sampling point into a spherical harmonic function space, to obtain projection visibility data of the target sampling point.

The initial visibility data of the target sampling point is projected into a spherical harmonic function space, to obtain projection visibility data of the target sampling point in the spherical harmonic function space. The projection visibility data can be represented using 16 floating-point numbers. The spherical harmonic function space is the space corresponding to the spherical harmonic function, and the spherical harmonic function is used for mapping each point on the sphere surface to a complex function value, where the projection visibility data is a set of complex function values corresponding to the initial visibility data. In this way, the data amount required for representing the visibility data can be decreased, facilitating the reduction of the space required for storing the visibility data, thus relieving the pressure of storing the visibility data.

Step 622: Determine an optimal visible direction corresponding to the target sampling point based on the projection visibility data of the target sampling point, the optimal visible direction being a central axis direction of a visible region corresponding to the target sampling point determined in the spherical harmonic function space.

According to the projection visibility data of projecting the target sampling point into the spherical harmonic function space, a visible region corresponding to the target sampling point is determined and then the optimal visible direction of the target sampling point is determined.

Figure 12:
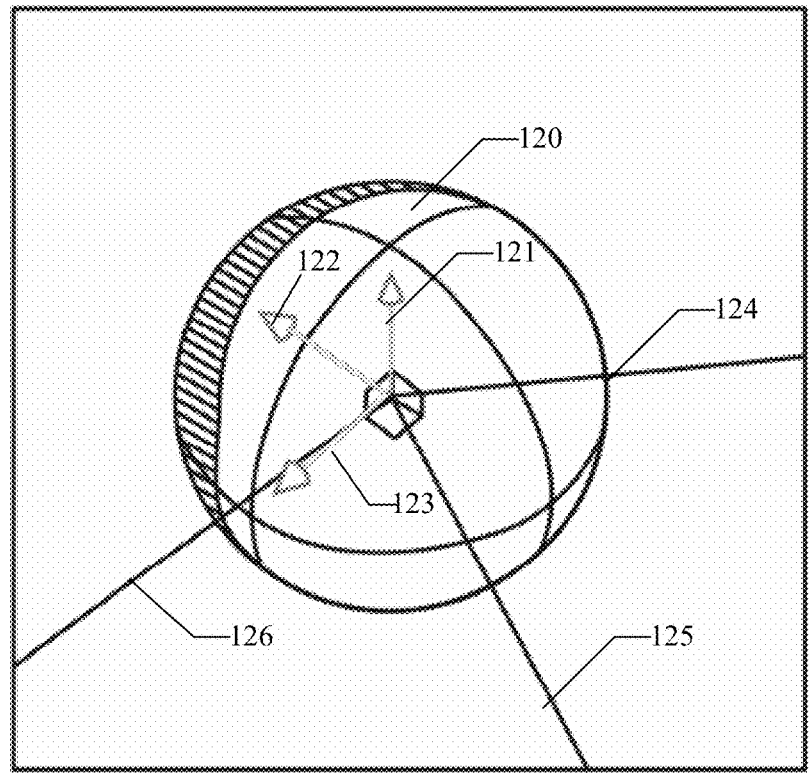
FIG. 12 is a schematic diagram of a coordinate system of an optimal direction according to an embodiment of this application.

In some embodiments, as shown in FIG. 12, FIG. 12 shows the projection visibility data of projecting the target sampling point into the spherical harmonic function space. The sphere 120 represents the projection visibility data obtained through the foregoing projection. The coordinate axes 121, 122, and 123 with arrows represent the initial coordinate axes in the spherical harmonic function space, respectively. A ray 124 represents the central axis direction of a visible region corresponding to the target sampling point in the spherical harmonic function space, that is, the optimal visible direction corresponding to the target sampling point. The rays 125 and 126 are the other two coordinate axes of the coordinate system determined by the right-hand rule based on the optimal visible direction corresponding to the target sampling point. The rays 124, 125, and 126 form a completely new coordinate system.

Step 623: Determine the optimal visible direction as the central axis direction of the target vertebra.

The target vertebra is projected into the fully new coordinate system obtained above. The central axis direction of the target vertebra is the optimal visible direction of the target sampling point. For example, taking the optimal visible direction of the target sampling point as the central axis direction and the fully new coordinate system above-described as the basis, the expression of the target vertebra is converted to obtain the projection representation corresponding to the target vertebra in the spherical harmonic function space. In this way, the difficulty of obtaining the parameter of the target vertebra can be obtained, thus improving the efficiency of determining the parameter of the target vertebra.

Step 624: Determine the opening angle and the scaling value of the target vertebra via value convergence of a second error function. The second error function is used for measuring a difference degree between a projection representation of the target vertebra in the spherical harmonic function space and the projection visibility data of the target sampling point.

The projection representation and the projection visibility data obtained above after the target vertebra is projected are compared to obtain the opening angle of the target vertebra. In some embodiments, with reference to the value of the second error function, the projection representations at different opening angles of the target vertebra can be traversed, to determine the opening angle of the target vertebra, so as to determine the scaling value of the target vertebra based on the opening angle.

Figure 13:
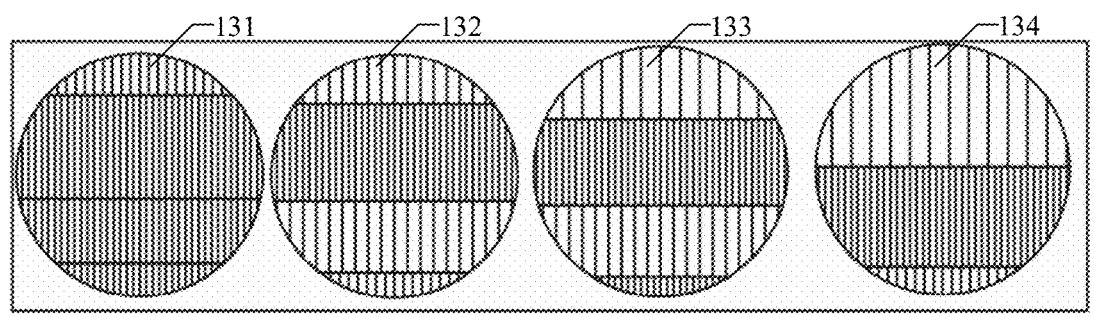
FIG. 13 is a schematic diagram of a target vertebra at different opening angles according to an embodiment of this application.

In some embodiments, as shown in FIG. 13, FIG. 13 shows the target vertebra at 4 different opening angles after projection. 131, 132, 133, and 134 represent the target vertebrae at opening angles of 15°, 30°, 45°, and 60° respectively. The uppermost regions of the target vertebrae at these 4 opening angles represent visibility data of the target vertebrae. In a normal case, the other regions are to be completely invisible black regions. However, due to the tendency of numerical oscillation during projection, some white regions appear in the black regions of the target vertebrae, but the white regions appearing do not affect the final rendering result. The 4 target vertebrae after projection are compared with the projection visibility data (distribution on a sphere surface) of the target sampling point, and the opening angle, of the target vertebra after projection, closest to the projection visibility data is determined as the final opening angle of the target vertebra. The target vertebra after projection is the projection representation of the target vertebra in the spherical harmonic function space.

In this embodiment of this application, frequency reduction is performed on complex visibility data of 16 floating-point numbers to obtain visibility data of 4 floating-point numbers. Visibility data of the vertebra represented using 4 floating-point numbers can well represent the visibility data in this embodiment of this application. This reduces a large amount of the visibility data while ensuring the accuracy of the visibility data.

Step 630: Determine an original value of visibility data of the target sampling point based on the target vertebra, the visibility data of the target sampling point including a central axis direction, an opening angle, and a scaling value of the target vertebra, and the scaling value being used for representing a brightness of a visible region.

The brightness of a visible region is used for representing the blocking situation of a visible region. The original value of the visibility data includes original value of the central axis direction, original value of the opening angle, and original value of the scaling value of the target vertebra.

The visibility data of the target sampling point is formed by 4 floating-point numbers, including the central axis direction, the opening angle, and the scaling value. The central axis direction is represented using 2 floating-point numbers, and the opening angle and scaling value are each represented using 1 floating-point number.

Step 640. Determine visibility data of each vertex of the three-dimensional model via value convergence of a first error function. The visibility data of each vertex is used for interpolation to obtain a recovery value of the visibility data of each of the sampling points. The first error function is used for measuring a difference degree between the recovery value and the original value of the visibility data of the sampling point and a change rate of the recovery value of the visibility data of the sampling point, and a quantity of the vertexes is smaller than a quantity of the sampling points.

Step 650: Store the visibility data of each vertex of the three-dimensional model.

Steps 640 and 650 are the same as those described in the foregoing embodiments. For content that is not described in this embodiment of this application, reference may be made to the foregoing embodiments. This is not described herein again.

In some embodiments, after the visibility data of each vertex of the three-dimensional model is obtained, when the three-dimensional model needs to be rendered, the visibility data of each sampling point can be inferred from the visibility data of each vertex, so as to render the three-dimensional model. A description is made below by using the target surface slice on the three-dimensional model as an example. This embodiment of this application can further include steps 660 to 680.

Step 660: Obtain visibility data of each vertex of the target surface slice on the three-dimensional model.

The target surface slice may be any surface slice on the three-dimensional model, and the target surface slice may be a polygon formed by vertexes in the three-dimensional model, such as a triangular surface slice formed by three vertexes. The surface slices fit with each other and evenly cover the surface of the three-dimensional model to form the surface mesh of the three-dimensional model. In some embodiments, the visibility data of each vertex of the target surface slice can be obtained from the vertex data of the three-dimensional model.

Step 670: Determine visibility data of a gravity center point of the target surface slice according to the visibility data of each vertex of the target surface slice.

The visibility data of the gravity center point and the position of the gravity center point of the target surface slice can be determined according to the calculation formula for the visibility data of each vertex and the gravity center point of the target surface slice. For example, according to the distance between each vertex and the gravity center point in the target surface slice, the weight corresponding to each vertex is determined, and the weighted calculation is performed on the visibility data of each vertex according to the weight corresponding to each vertex, to obtain the visibility data of the gravity center point.

Step 680: Perform interpolation according to the visibility data of each vertex of the target surface slice and the visibility data of the gravity center point of the target surface slice, to obtain the recovery value of the visibility data of each sampling point within the target surface slice.

Interpolation is performed with an interpolation function according to the visibility data of each vertex and gravity center point of the target surface slice, to obtain the recovery value of the visibility data of each sampling point of the target surface slice. After the recovery value of the visibility data of each sampling point of the three-dimensional model is obtained, the three-dimensional model is rendered according to the recovery value.

In summary, in this embodiment of this application, the visibility data of the vertex and the visibility data of the gravity center of the target surface slice are interpolated, to obtain the visibility data of the sampling point of the target surface slice, ensuring the accuracy of the rendered three-dimensional model. In addition, accurate visibility data can be obtained using a simple interpolation function, reducing recovery complexity of the visibility data. The visibility data of each sampling point can be recovered based on visibility data of a small number of vertexes. This further reduces the amount of grayscale calculation for visibility data, improving the recovery efficiency of the visibility data, thus improving the efficiency of rendering the three-dimensional model. In addition, the three-dimensional model is rendered with reference to accurate visibility data, further improving the effect of rendering the three-dimensional model.

In addition, interpolation is performed based on the target vertex and gravity center point in the target surface slice, to obtain the visibility data of each sampling point of the target surface slice, ensuring data accuracy.

Moreover, in this embodiment of this application, the visibility data of the sampling point is fitted into the spherical harmonic function space, and then the target vertebra of 4 floating-point numbers is obtained through the frequency reduction of data, where the frequency reduction reduces the amount of the visibility data and avoids much loss of accuracy. This ensures the accuracy of the visibility data while greatly reducing the pressure of storing the visibility data.

Taking the target vertebra corresponding to the target sampling point as an example, description is made about the process of calculating the opening angle and scaling value of target vertebra corresponding to each sampling point.

After the target vertebra of 4 floating-point numbers is projected into the spherical harmonic function space, the expression of the visibility data is as follows:

$V_{cone}(S,\alpha,\omega) = S\Sigma_{i=0}^{15} c_i(\alpha) Y_i(\omega)$, where

S, $\alpha$, $\omega$ represents the scaling value, opening angle, and central axis direction vector of the target vertebra, respectively, $c_i(\alpha)$ represents a value corresponding to each of 16 floating-point numbers in the spherical harmonic function, and $Y_i(\omega)$ represents a primary function of the spherical harmonic function.

The expression of the visibility data of the target vertebra with 4 floating-point numbers is as follows:

$V_{cone}(x) = S(0 <= x <= \alpha)$, where

S represents the scaling value of the target vertebra. The brightness of the target vertebra is determined by the scaling value, and all brightnesses of the target vertebra are all set to the same brightness, that is, the same scaling value.

$c_i(\alpha)$ can be obtained through calculation using a integration tool, and the result of $c_i(\alpha)$ is as follows:

$$c_0(\alpha) = \int_0^{2\pi} \int_0^{\alpha} 1 * \frac{1}{2\sqrt{\pi}} \sin(\theta) d\theta d\phi = -\sqrt{\pi}(-1 + \cos(\alpha));$$

$$c_2(\alpha) = \int_0^{2\pi} \int_0^{\alpha} 1 * \frac{\sqrt{3}}{2\sqrt{\pi}} \cos(\theta) \sin(\theta) d\theta d\phi = \frac{1}{2} \sqrt{3} \pi \sin^2(\alpha);$$

$$c_6(\alpha) = \int_0^{2\pi} \int_0^{\alpha} 1 * \frac{\sqrt{5}}{4\sqrt{\pi}} (3\cos^2(\theta) - 1) \sin(\theta) d\theta d\phi = \frac{1}{2} \sqrt{5} \pi \sin^2(\alpha) \cos(\alpha);$$

$$c_{12}(\alpha) = \frac{1}{16} \sqrt{7} \pi \sin^2(\alpha)(5\cos(2\alpha) + 3));$$

and $c_{1,3,4,5,7,8,9,10,11,13,14,15}(\alpha) = 0$.

The 16 floating-point values are brought into the visibility data of the spherical harmonic function of the 16 floating-point numbers, to obtain the visibility data of the target vertebra after projection, that is, the projection representation of the target vertebra in the spherical harmonic function space.

Then, minimizing the difference between $V_{cone}(S, \alpha, \omega)$ and $V_{SH}(\omega)$ (that is, the projection visibility data of the target sampling point), that is, minimizing a second error function, obtains the scaling value of the target vertebra of the target sampling point. Such a process can be expressed as follows:

$$E = \int_\Omega (V_{cone}(S,\alpha,\omega) - V_{SH}(\omega))^2 d\omega = \int_\Omega (S\Sigma_{i=0}^{15} c_i(\alpha) Y_i(\omega) - \Sigma_{i=0}^{15} v_i Y_i(\omega))^2 d\omega.$$

$\alpha$ and S are derived respectively:

$$\frac{dE}{d\alpha} = \int_\Omega 2 \left( S\sum_{i=0}^{15} c_i(\alpha) Y_i(\omega) - \sum_{i=0}^{15} v_i Y_i(\omega) \right) S \sum_{i=0}^{15} \frac{dc_i(\alpha)}{d\alpha} Y_i(\omega) d\omega;$$

and $$\frac{dE}{dS} = \int_\Omega 2 \left( S\sum_{i=0}^{15} c_i(\alpha) Y_i(\omega) - \sum_{i=0}^{15} v_i Y_i(\omega) \right) \sum_{i=0}^{15} c_i(\alpha) Y_i(\omega) d\omega.$$

Based on the orthogonal normality of $c_i(\alpha)$, the following can be obtained:

$\int_{106} Y_i(\omega)^2 d\omega = 1$, and $\int_\Omega Y_i(\omega) Y_j(\omega) d\omega = 0$.

Therefore, the following can be deduced:

$$\frac{dE}{d\alpha} = 2S^2 \sum_{i=0}^{15} c_i(\alpha) \frac{dc_i(\alpha)}{d\alpha} - 2S \sum_{i=0}^{15} v_i \frac{dc_i(\alpha)}{d\alpha};$$

and $$\frac{dE}{dS} = 2S \sum_{i=0}^{15} c_i(\alpha)^2 - 2 \sum_{i=0}^{15} c_i(\alpha) v_i(\alpha).$$

Setting them to 0 can obtain equations of extreme value point conditions:

$$\sum_{i=0}^{15} v_i \frac{dc_i(\alpha)}{d\alpha} - \frac{\Sigma_{i=0}^{15} v_i(\alpha) c_i(\alpha)}{\Sigma_{i=0}^{15} c_i(\alpha)^2} \sum_{i=0}^{15} c_i \frac{dc_i(\alpha)}{d\alpha} = 0;$$

and $$S = \frac{\Sigma_{i=0}^{15} v_i(\alpha) c_i(\alpha)}{\Sigma_{i=0}^{15} c_i(\alpha)^2}.$$

Dichotomy can be used for calculation to obtain the scaling value of the circular cone, to be specific, to obtain the visibility data represented by the circular cone of the target vertex. For example, as long as the opening angle of the target vertebra is determined, the scaling value of the target vertebra can be obtained based on the foregoing formula. The visibility data is represented by the opening angle, the central axis direction, and the scaling value of the target vertebra.

Taking the process of building and rendering a three-dimensional model in a game scene as an example, the following describes the application of the technical solution provided in this embodiment of this application to this scene. The method can include the following steps (1 to 6):

1. Obtain model structure data and model material data of a three-dimensional model.

The model structure data includes a model size, a surface contour, a bone contour and other data. The model material data includes a model material, a surface color, and other data.

2. Construct a model structure of the three-dimensional model according to the model structure data of the three-dimensional model.

The model structure of the three-dimensional model is constructed according to the model size, the surface contour, the bone contour, and other data of the three-dimensional model.

3. Perform first rendering according to the model material data of the three-dimensional model, to obtain a material and a surface color of the three-dimensional model.

The constructed model structure of the three-dimensional model is rendered according to the model material data of the three-dimensional model, to obtain the material and the surface color of the three-dimensional model. The material of the three-dimensional model includes a density, a surface roughness, a surface gloss, and the like of the three-dimensional model.

4. Set motion data of skeletons of the three-dimensional model according to a set motion manner of the three-dimensional model.

The set motion manner is the pre-designed motion manner of the three-dimensional model during the design of the three-dimensional model. Specifically, the motion data of the skeletons of the three-dimensional model is set according to the set motion manner of the three-dimensional model. The skeletons of the three-dimensional model move according to the foregoing motion data, so as to drive the three-dimensional model to move and make corresponding actions designed, thus obtaining the motion manner of the three-dimensional model. The motion manner of the three-dimensional model is the same as the set motion manner of the three-dimensional model.

5. Obtain visibility data of the three-dimensional model according to light in the game scene where the three-dimensional model is located.

The three-dimensional model subjected to the first rendering and provided with set skeletal motion data is putted in the game scene with light, and the visibility data of the three-dimensional model is obtained using the method in the foregoing embodiment and stored. The three-dimensional model drives, according to the skeletal motion data, the skeletons to move, such that the three-dimensional model moves in the game scene. In addition, the obtained visibility data of the three-dimensional model changes with the motion of the three-dimensional model, and visibility data obtained under all motion states is stored.

6. Perform second rendering according to the visibility data of the three-dimensional model, to obtain a rendered three-dimensional model.

The second rendering is performed according to the stored visibility data of the three-dimensional model to obtain the rendered three-dimensional model. Surface of the three-dimensional model obtained after the second rendering shows a brightness, and this brightness represented by the surface of the three-dimensional model can change with the motion of the three-dimensional model.

In this embodiment, the three-dimensional model formed through the first rendering and provided with the set skeletal motion data is putted in the game scene, and the light in the game scene is used for performing second rendering on the visibility data of the three-dimensional model, to obtain a three-dimensional model with a brightness. When the second rendering is not performed and the three-dimensional model is putted in the game scene, because the light factor is not considered, the surface of the three-dimensional model does not show the brightness difference caused by the light. As a result, the three-dimensional model does not fit into the game scene well, making itself such a misfit. However, after the light factor is considered and the second rendering is performed on the three-dimensional model, the brightness data of the three-dimensional model is presented, such that the three-dimensional model can fit into the game environment well. In addition, when the three-dimensional model moves, the brightness of the surface of the three-dimensional model can also change with the motion, making the three-dimensional model more realistic in the game environment.

The following describes apparatus embodiments of this application, which can be used for executing the method embodiments of this application. For details not disclosed in the apparatus embodiments of this application, refer to the method embodiments of this application.

Figure 14:
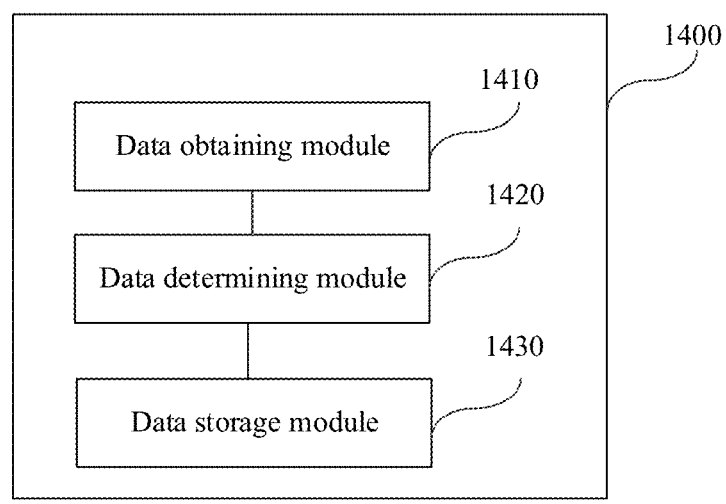
FIG. 14 is a block diagram of an apparatus for processing visibility data of a three-dimensional model according to an embodiment of this application.

Referring to FIG. 14, FIG. 14 is a block diagram of an apparatus for processing visibility data of a three-dimensional model according to an embodiment of this application. The apparatus has functions of implementing the foregoing method examples. The functions may be implemented by using hardware or by hardware executing corresponding software. The apparatus may be a computer device or set in a computer device. The apparatus 1400 may include: a data obtaining module 1410, a data determining module 1420, and a data storage module 1430.

The data obtaining module 1410 is configured to obtain original values of visibility data of a plurality of sampling points of the three-dimensional model. The visibility data is used for representing a visibility of the sampling point, and the sampling point is a pixel level.

The data determining module 1420 is configured to determine visibility data of each vertex of the three-dimensional model via value convergence of a first error function. The visibility data of each vertex is used for interpolation to obtain a recovery value of the visibility data of each of the sampling points. The first error function is used for measuring a difference degree between the recovery value and the original value of the visibility data of the sampling point and a change rate of the recovery value of the visibility data of the sampling point, and a quantity of the vertexes is smaller than a quantity of the sampling points.

The data storage module 1430 is configured to store the visibility data of each vertex of the three-dimensional model.

Figure 15:
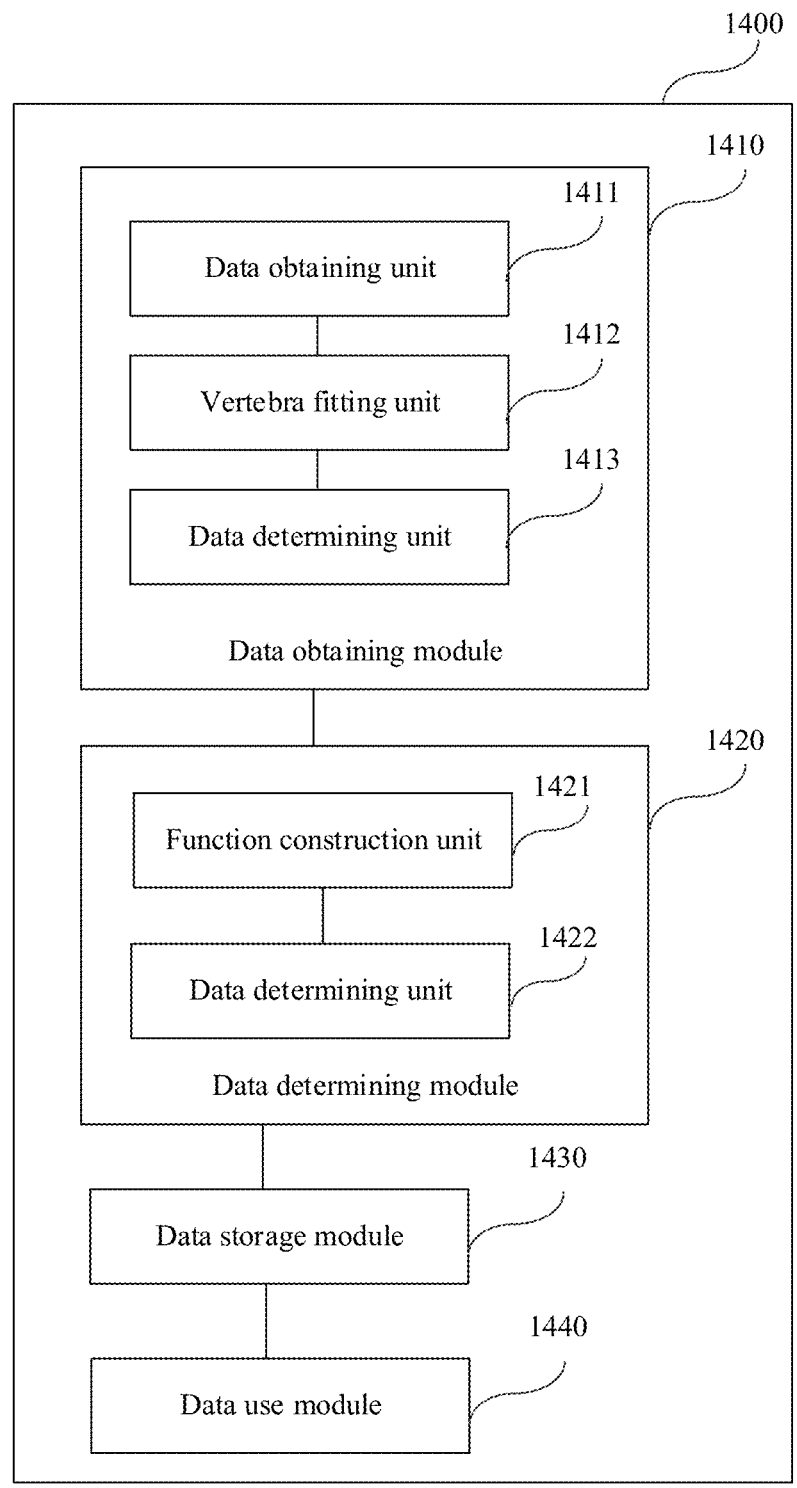
FIG. 15 is a block diagram of an apparatus for processing visibility data of a three-dimensional model according to another embodiment of this application.

In some embodiments, as shown in FIG. 15, the data determining module 1420 includes: a function construction unit 1421 and a data determining unit 1422.

The function construction unit 1421 is configured to construct the first error function based on the recovery value and the original value of the visibility data of the sampling point. A value of the first error function is positively correlated with the difference degree between the recovery value and the original value of the visibility data of the sampling point, and the value of the first error function is positively correlated with the change rate of the recovery value of the visibility data of the sampling point.

The data determining unit 1422 is configured to determine the visibility data of each vertex of the three-dimensional model via minimizing the value of the first error function.

In some embodiments, the function construction unit 1421 is further configured to construct a first sub-function based on a difference between the recovery value and the original value of the visibility data of the sampling point, a value of the first sub-function being positively correlated with the difference degree between the recovery value and the original value of the visibility data of the sampling point; construct a second sub-function based on a difference between change rates corresponding to at least a set of adjacent surface slices on the three-dimensional model, a change rate corresponding to a target surface slice on the three-dimensional model being a change rate of a recovery value of visibility data of each sampling point within the target surface slice; and a value of the second sub-function being positively correlated with the change rate of the recovery value of the visibility data of the sampling point; and construct the first error function based on the first sub-function and the second sub-function.

In some embodiments, as shown in FIG. 15, the data obtaining module 1410 includes: a data obtaining unit 1411, a vertebra fitting unit 1412, and a data determining unit 1413.

The data obtaining unit 1411 is configured to obtain initial visibility data of a target sampling point of the three-dimensional model. The initial visibility data of the target sampling point includes: intersection data of the target sampling point used as an origin in a plurality of directions.

The vertebra fitting unit 1412 is configured to determine a target vertebra used for fitting the initial visibility data of the target sampling point.

The data determining unit 1413 is configured to determine an original value of visibility data of the target sampling point based on the target vertebra, the visibility data of the target sampling point including a central axis direction, an opening angle, and a scaling value of the target vertebra, and the scaling value being used for representing a brightness of a visible region.

In some embodiments, the vertebra fitting unit 1412 is further configured to project the initial visibility data of the target sampling point into a spherical harmonic function space, to obtain projection visibility data of the target sampling point; determine an optimal visible direction corresponding to the target sampling point based on the projection visibility data of the target sampling point, the optimal visible direction being a central axis direction of a visible region corresponding to the target sampling point determined in the spherical harmonic function space; determine the optimal visible direction as the central axis direction of the target vertebra; and determine the opening angle and the scaling value of the target vertebra via value convergence of a second error function, the second error function being used for measuring a difference degree between a projection representation of the target vertebra in the spherical harmonic function space and the projection visibility data of the target sampling point.

In some embodiments, the visibility data of the target sampling point is represented using 4 floating-point numbers. The central axis direction of the target vertebra is represented using 2 floating-point numbers, the opening angle of the target vertebra is represented using 1 floating-point number, and the scaling value of the target vertebra is represented using 1 floating-point number.

In some embodiments, as shown in FIG. 15, the apparatus 1400 further includes a data use module 1440.

The data use module 1440 is configured to obtain visibility data of each vertex of the target surface slice on the three-dimensional model from the vertex data of the three-dimensional model; determine visibility data of a gravity center point of the target surface slice according to the visibility data of each vertex of the target surface slice; and perform interpolation according to the visibility data of each vertex of the target surface slice and the visibility data of the gravity center point of the target surface slice, to obtain the recovery value of the visibility data of each sampling point within the target surface slice.

In summary, in this embodiment, the original value of the visibility data of each sampling point of the three-dimensional model is obtained, and the use of the first error function allows a minimum difference degree between the recovery value of the visibility data of the sampling point obtained through interpolation on the visibility data of each vertex and the original value. That is, when the convergence of the first error function, the final result of the visibility data of each vertex of the three-dimensional model is obtained, and the visibility data of each vertex is stored without the need to store visibility data of a large number of sampling points. This substantially reduces the space used for storing the visibility data, thus relieving the pressure of storing the visibility data of the three-dimensional model, and improving the efficiency of rendering the three-dimensional model. In addition, the first error function is designed for measuring the difference degree between the recovery value and the original value of the visibility data of the sampling point. Convergence of the first error function can enable the difference degree between the recovery value and the original value of the visibility data of the sampling point to be as small as possible, such that the difference between a surface of the rendered three-dimensional model and a surface of the original three-dimensional model is as small as possible, ensuring the accuracy during three-dimensional model rendering. Moreover, the first error function is used for measuring the change rate of the recovery value of the visibility data of the sampling point. Convergence of the first error function can make the recovery values of the visibility data continuous, thus enhancing the visual effect of the surface of the three-dimensional model after visibility data rendering.

It is to be pointed out, when the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus provided in the foregoing embodiments and the method embodiments fall within a same conception. For details of a specific implementation process, refer to the method embodiments. Details are not described herein again.

Figure 16:
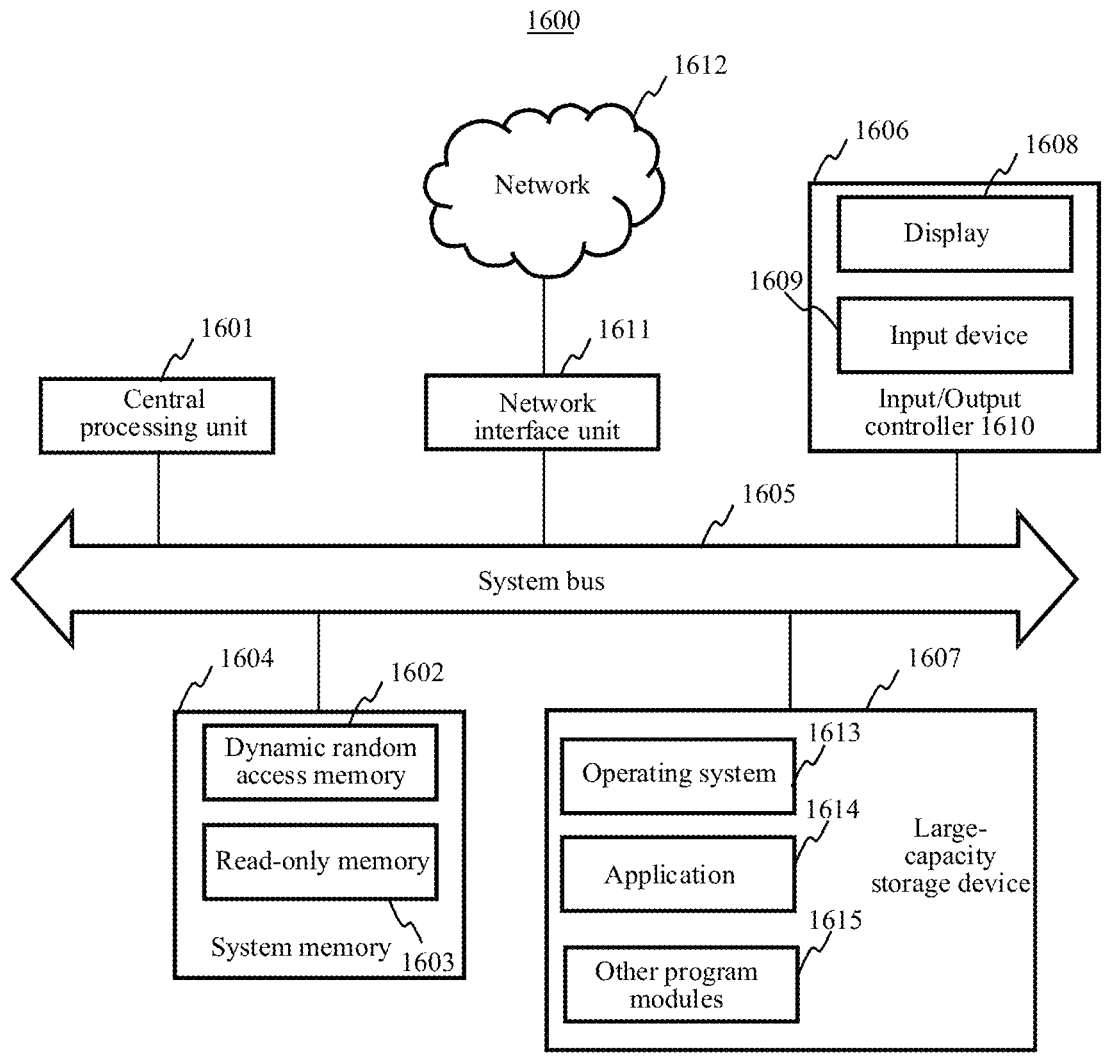
FIG. 16 is a schematic structural diagram of a computer device according to an embodiment of this application.

Referring to FIG. 16, FIG. 16 is a schematic structural diagram of a computer device according to an embodiment of this application. The computer device 1600 may be any electronic device with data computing, processing, and storage functions, such as the terminal or server described above. They can be used to implement the method for processing visibility data of a three-dimensional model provided in the foregoing embodiment. Specifically, the computer device 1600 includes a central processing unit (CPU) 1601 (for example, a central processor, a graphics processing unit (GPU), and a field programmable gate array (FPGA)), a system memory 1604 including a random-access memory (RAM) 1602 and a read-only memory (ROM) 1603, and a system bus 1605 connecting the system memory 1604 and the central processing unit 1601. The computer device 1600 further includes a basic input/output (I/O) system 1606 assisting in transmitting information between components in the server, and a large-capacity storage device 1607 configured to store an operating system 1613, an application program 1614, and another program module 1615.

The basic input/output system 1606 includes a display 1608 configured to display information and an input device 1609, such as a mouse or a keyboard, configured to input information for a user. The display 1608 and the input device 1609 are both connected to the central processing unit 1601 by using an input/output controller 1610 connected to the system bus 1605. The basic input/output system 1606 may further include the input/output controller 1610 to be configured to receive and process inputs from a plurality of other devices such as a keyboard, a mouse, and an electronic stylus. Similarly, the input/output controller 1610 further provides an output to a display screen, a printer, or another type of output device.

The large-capacity storage device 1607 is connected to the central processing unit 1601 by using a large-capacity storage controller (not shown) connected to the system bus 1605. The large-capacity storage device 1607 and a computer-readable medium associated with the large-capacity storage device provide non-volatile storage to the computer device 1600. That is, the large-capacity storage device 1607 may include a computer-readable medium (not shown) such as a hard disk or a compact disc read-only memory (CD-ROM) drive.

Generally, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable read-only memory (EPROM), an electrically erasable programmable read-only memory (EEPROM), a flash memory or another solid-state memory technology, a CD-ROM, a digital video disc (DVD) or another optical memory, a tape cartridge, a magnetic cassette, a magnetic disk memory, or other magnetic storage devices. Certainly, a person skilled in the related art can know that the computer storage medium is not limited to the foregoing several types. The system memory 1604 and the large-capacity storage device 1607 may be collectively referred to as a memory.

According to the embodiments of this application, the computer device 1600 may further be connected, through a network such as the Internet, to a remote computer on the network and run. That is, the computer device 1600 may be connected to a network 1612 by using a network interface unit 1611 connected to the system bus 1605, or may be connected to another type of network or a remote computer system (not shown) by using a network interface unit 1616.

The memory further includes a computer program, and the computer program is stored in the memory and performed by one or more processors through configuration, to implement the method for processing visibility data of a three-dimensional model.

In an exemplary embodiment, a non-transitory computer-readable storage medium is also provided. The storage medium stores a computer program, and the computer program is executed by a processor of a computer device to perform the method for processing visibility data of a three-dimensional model.

In some embodiments, the computer-readable storage medium may include: a read-only memory (ROM), a random-access memory (RAM), a solid state drive (SSD), an optical disc, or the like. The random-access memory may include a resistance random access memory (Re-RAM) and a dynamic random access memory (DRAM).

In an exemplary embodiment, a computer program product is also provided. The computer program product includes a computer program stored in a non-transitory computer-readable storage medium. A processor of the computer device reads from the computer-readable storage medium and executes the computer program, to enable the computer device to perform the above-described method for processing visibility data of a three-dimensional model.

The information (including but not limited to subject device information, subject personal information, and the like), data (including but not limited to data for analysis, stored data, displayed data, and the like), and signals involved in this application are all authorized by the subject or fully authorized by all parties, and the collection, use and processing of the relevant data need to comply with the relevant laws, regulations, and standards of relevant countries and regions. For example, the three-dimensional model and the like involved in this application are obtained with full authorization.

It is to be understood that "a plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application. In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units.

Moreover, each module or unit can be part of an overall module or unit that includes the functionalities of the module or unit.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for processing visibility data of a three-dimensional model, performed by a computer device, comprising:
obtaining original values of visibility data of a plurality of sampling points of the three-dimensional model, wherein the three-dimensional model is formed by a plurality of surface slices, each surface slice having a polygon formed by a set of vertexes with sampling points on the surface slice surrounded by the set of vertexes;
determining visibility data of a plurality of vertexes of the three-dimensional model based on (i) a first error function measuring differences between recovery values of the visibility data of the sampling points on a surface slice of the three-dimensional model from interpolation of the visibility data of the vertexes of the surface slice of the three-dimensional model and the original values of the visibility data of the sampling points on the surface slice of the three-dimensional model and (ii) change rates of the recovery values of the visibility data of the sampling points on the surface slice of the three-dimensional model; and
storing the visibility data of each vertex of the three-dimensional model.

2. The method according to claim 1, wherein a quantity of the vertexes of the three-dimensional model is smaller than a quantity of the sampling points of the three-dimensional model.

3. The method according to claim 1, wherein the determining visibility data of a plurality of vertexes of the three-dimensional model comprises:
constructing the first error function based on the recovery values and the original values of the visibility data of the sampling points, a value of the first error function being positively correlated with the differences between the recovery values and the original values of the visibility data of the sampling points, and the value of the first error function being positively correlated with the change rate of the recovery values of the visibility data of the sampling point; and
determining the visibility data of the vertexes of the three-dimensional model via minimizing the value of the first error function.

4. The method according to claim 3, wherein the constructing the first error function based on the recovery values and the original values of the visibility data of the sampling points comprises:
constructing a first sub-function based on the differences between the recovery values and the original values of the visibility data of the sampling points;
constructing a second sub-function based on differences between the change rates of the recovery values of the visibility data of the sampling points corresponding to at least a set of adjacent surface slices on the three-dimensional model; and
constructing the first error function based on the first sub-function and the second sub-function.

5. The method according to claim 1, wherein the obtaining original values of visibility data of a plurality of sampling points of the three-dimensional model comprises:
obtaining initial visibility data of a target sampling point of the three-dimensional model, the initial visibility data of the target sampling point comprising: intersection data of the target sampling point used as an origin in a plurality of directions;
determining a target vertebra used for fitting the initial visibility data of the target sampling point; and
determining an original value of the visibility data of the target sampling point based on the target vertebra, the visibility data of the target sampling point comprising a central axis direction, an opening angle, and a scaling value of the target vertebra, and the scaling value representing a brightness of a visible region of the target sampling point.

6. The method according to claim 1, wherein the method further comprises:
obtaining visibility data of each vertex of a target surface slice on the three-dimensional model;
determining visibility data of a gravity center point of the target surface slice according to the visibility data of each vertex of the target surface slice; and
performing interpolation according to the visibility data of each vertex of the target surface slice and the visibility data of the gravity center point of the target surface slice, to obtain the recovery value of the visibility data of each sampling point within the target surface slice.

7. A computer device, comprising a processor and a memory, the memory storing a computer program, and the computer program being loaded and executed by the processor and causing the computer device to implement a method for processing visibility data of a three-dimensional model including:
obtaining original values of visibility data of a plurality of sampling points of the three-dimensional model, wherein the three-dimensional model is formed by a plurality of surface slices, each surface slice having a polygon formed by a set of vertexes with sampling points on the surface slice surrounded by the set of vertexes;
determining visibility data of a plurality of vertexes of the three-dimensional model based on (i) a first error function measuring differences between recovery values of the visibility data of the sampling points on a surface slice of the three-dimensional model from interpolation of the visibility data of the vertexes of the surface slice of the three-dimensional model and the original values of the visibility data of the sampling points on the surface slice of the three-dimensional model and (ii) change rates of the recovery values of the visibility data of the sampling points on the surface slice of the three-dimensional model; and
storing the visibility data of each vertex of the three-dimensional model.

8. The computer device according to claim 7, wherein a quantity of the vertexes of the three-dimensional model is smaller than a quantity of the sampling points of the three-dimensional model.

9. The computer device according to claim 7, wherein the determining visibility data of a plurality of vertexes of the three-dimensional model comprises:
constructing the first error function based on the recovery values and the original values of the visibility data of the sampling points, a value of the first error function being positively correlated with the differences between the recovery values and the original values of the visibility data of the sampling points, and the value of the first error function being positively correlated with the change rate of the recovery values of the visibility data of the sampling point; and determining the visibility data of the vertexes of the three-dimensional model via minimizing the value of the first error function.

10. The computer device according to claim 9, wherein the constructing the first error function based on the recovery values and the original values of the visibility data of the sampling points comprises:

constructing a first sub-function based on the differences between the recovery values and the original values of the visibility data of the sampling points;

constructing a second sub-function based on differences between the change rates of the recovery values of the visibility data of the sampling points corresponding to at least a set of adjacent surface slices on the three-dimensional model; and constructing the first error function based on the first sub-function and the second sub-function.

11. The computer device according to claim 7, wherein the obtaining original values of visibility data of a plurality of sampling points of the three-dimensional model comprises:

obtaining initial visibility data of a target sampling point of the three-dimensional model, the initial visibility data of the target sampling point comprising: intersection data of the target sampling point used as an origin in a plurality of directions;

determining a target vertebra used for fitting the initial visibility data of the target sampling point; and determining an original value of the visibility data of the target sampling point based on the target vertebra, the visibility data of the target sampling point comprising a central axis direction, an opening angle, and a scaling value of the target vertebra, and the scaling value representing a brightness of a visible region of the target sampling point.

12. The computer device according to claim 7, wherein the method further comprises:

obtaining visibility data of each vertex of a target surface slice on the three-dimensional model;

determining visibility data of a gravity center point of the target surface slice according to the visibility data of each vertex of the target surface slice; and performing interpolation according to the visibility data of each vertex of the target surface slice and the visibility data of the gravity center point of the target surface slice, to obtain the recovery value of the visibility data of each sampling point within the target surface slice.

13. A non-transitory computer-readable storage medium, storing a computer program, the computer program being loaded and executed by a processor of a computer device and causing the computer device to implement a method for processing visibility data of a three-dimensional model including:

obtaining original values of visibility data of a plurality of sampling points of the three-dimensional model, wherein the three-dimensional model is formed by a plurality of surface slices, each surface slice having a polygon formed by a set of vertexes with sampling points on the surface slice surrounded by the set of vertexes;

determining visibility data of a plurality of vertexes of the three-dimensional model based on (i) a first error function measuring differences between recovery values of the visibility data of the sampling points on a surface slice of the three-dimensional model from interpolation of the visibility data of the vertexes of the surface slice of the three-dimensional model and the original values of the visibility data of the sampling points on the surface slice of the three-dimensional model and (ii) change rates of the recovery values of the visibility data of the sampling points on the surface slice of the three-dimensional model; and storing the visibility data of each vertex of the three-dimensional model.

14. The non-transitory computer-readable storage medium according to claim 13, wherein a quantity of the vertexes of the three-dimensional model is smaller than a quantity of the sampling points of the three-dimensional model.

15. The non-transitory computer-readable storage medium according to claim 13, wherein the determining visibility data of a plurality of vertexes of the three-dimensional model comprises:

constructing the first error function based on the recovery values and the original values of the visibility data of the sampling points, a value of the first error function being positively correlated with the differences between the recovery values and the original values of the visibility data of the sampling points, and the value of the first error function being positively correlated with the change rate of the recovery values of the visibility data of the sampling point; and determining the visibility data of the vertexes of the three-dimensional model via minimizing the value of the first error function.

16. The non-transitory computer-readable storage medium according to claim 15, wherein the constructing the first error function based on the recovery values and the original values of the visibility data of the sampling points comprises:

constructing a first sub-function based on the differences between the recovery values and the original values of the visibility data of the sampling points;

constructing a second sub-function based on differences between the change rates of the recovery values of the visibility data of the sampling points corresponding to at least a set of adjacent surface slices on the three-dimensional model; and constructing the first error function based on the first sub-function and the second sub-function.

17. The non-transitory computer-readable storage medium according to claim 13, wherein the obtaining original values of visibility data of a plurality of sampling points of the three-dimensional model comprises:

obtaining initial visibility data of a target sampling point of the three-dimensional model, the initial visibility data of the target sampling point comprising: intersection data of the target sampling point used as an origin in a plurality of directions;

determining a target vertebra used for fitting the initial visibility data of the target sampling point; and determining an original value of the visibility data of the target sampling point based on the target vertebra, the visibility data of the target sampling point comprising a central axis direction, an opening angle, and a scaling value of the target vertebra, and the scaling value representing a brightness of a visible region of the target sampling point.

18. The non-transitory computer-readable storage medium according to claim 13, wherein the method further comprises:
- obtaining visibility data of each vertex of a target surface slice on the three-dimensional model;
- determining visibility data of a gravity center point of the target surface slice according to the visibility data of each vertex of the target surface slice; and
- performing interpolation according to the visibility data of each vertex of the target surface slice and the visibility data of the gravity center point of the target surface slice, to obtain the recovery value of the visibility data of each sampling point within the target surface slice.

\* \* \* \* \*